(12) United States Patent
Talwerdi et al.

(10) Patent No.: US 10,713,347 B2
(45) Date of Patent: Jul. 14, 2020

(54) MOBILE, PORTABLE APPARATUS FOR AUTHENTICATING A SECURITY ARTICLE AND METHOD OF OPERATING THE PORTABLE AUTHENTICATION APPARATUS

(71) Applicant: SICPA HOLDING SA, Prilly (CH)

(72) Inventors: Mehdi Talwerdi, British Columbia (CA); Winfield Fisher, British Columbia (CA)

(73) Assignee: SICPA HOLDING SA, Prilly (CH)

(*) Notice: Subject to any disclaimer, the term of this patent is extended or adjusted under 35 U.S.C. 154(b) by 226 days.

(21) Appl. No.: 15/569,688

(22) PCT Filed: Apr. 8, 2016

(86) PCT No.: PCT/EP2016/057751
§ 371 (c)(1),
(2) Date: Oct. 26, 2017

(87) PCT Pub. No.: WO2016/162479
PCT Pub. Date: Oct. 13, 2016

(65) Prior Publication Data
US 2018/0121643 A1 May 3, 2018

Related U.S. Application Data

(60) Provisional application No. 62/145,924, filed on Apr. 10, 2015.

(51) Int. Cl.
*G06F 21/00* (2013.01)
*G06F 21/34* (2013.01)
(Continued)

(52) U.S. Cl.
CPC ............. *G06F 21/34* (2013.01); *G06F 21/32* (2013.01); *G06F 21/33* (2013.01); *G06F 21/86* (2013.01);
(Continued)

(58) Field of Classification Search
CPC ..................................................... G06F 21/34
See application file for complete search history.

(56) References Cited

U.S. PATENT DOCUMENTS

| 4,705,300 A | 11/1987 | Berning et al. |
| 4,705,356 A | 11/1987 | Berning et al. |

(Continued)

FOREIGN PATENT DOCUMENTS

| EP | 0601483 | 6/1994 |
| EP | 0686675 | 2/1998 |

(Continued)

OTHER PUBLICATIONS

G. Pfaff and P. Reynders, "Angle-Dependent Optical Effects Deriving from Submicron Structures of Films and Pigments", Chem. Rev. 99 (1999), pp. 1963-1981.

(Continued)

*Primary Examiner* — Josnel Jeudy
(74) *Attorney, Agent, or Firm* — Muncy, Geissler, Olds & Lowe, P.C.

(57) ABSTRACT

A mobile, portable apparatus for authenticating, verification and certification of a security article, the apparatus comprising an enclosure securely housing components of the apparatus; an authentication device operable to authenticate the security article; a power source, preferably of solar type, different type of batteries, uninterruptable power supply, different type of charging facilities and/or any source of energy; an imaging device for simultaneously imaging in opposing and/or multiple directions; a programmable and configurable control panel; an information processing unit; and a printing device for printing and/or special marking on the security article, wherein the imaging device is portably coupled to the authentication device; and wherein the control panel is arranged as an interface command and control center connected to the information processing unit and the (Continued)

other components of the apparatus. The method involves determining whether a registered operator of the portable authentication apparatus is verified; and permitting access to an authentication device of the portable authentication apparatus if the registered operator is verified. The system includes the portable authentication apparatus; and a remote server operable to communicate with the portable authentication apparatus.

20 Claims, 13 Drawing Sheets

(51) Int. Cl.
    *G06F 21/32* (2013.01)
    *G06F 21/86* (2013.01)
    *G06F 21/33* (2013.01)
    *G07D 13/00* (2006.01)
    *G07C 9/25* (2020.01)
    *G07C 9/26* (2020.01)

(52) U.S. Cl.
    CPC ............ *G07C 9/257* (2020.01); *G07D 13/00* (2013.01); *G06F 2221/2111* (2013.01); *G06F 2221/2143* (2013.01); *G07C 9/26* (2020.01)

(56) References Cited

U.S. PATENT DOCUMENTS

| | | | |
|---|---|---|---|
| 4,721,271 A | 1/1988 | Goldstein et al. | |
| 4,838,648 A | 6/1989 | Phillips et al. | |
| 5,084,351 A | 1/1992 | Philips et al. | |
| 5,211,877 A | 5/1993 | Andrejewski et al. | |
| 5,214,530 A | 5/1993 | Coombs et al. | |
| 5,281,480 A | 1/1994 | Phillips et al. | |
| 5,362,315 A | 11/1994 | Muller-Rees et al. | |
| 5,383,995 A | 1/1995 | Phillips et al. | |
| 5,569,535 A | 10/1996 | Phillips et al. | |
| 5,571,624 A | 11/1996 | Phillips et al. | |
| 5,650,729 A | 7/1997 | Potter | |
| 6,410,130 B1 | 6/2002 | Schuhmacher et al. | |
| 6,423,246 B1 | 7/2002 | Kasch et al. | |
| 6,531,221 B1 | 3/2003 | Schuhmacher et al. | |
| 6,570,648 B1 | 5/2003 | Müller-Rees et al. | |
| 6,582,781 B1 | 6/2003 | Schuhmacher et al. | |
| 6,732,961 B2 | 5/2004 | Leigeber et al. | |
| 6,838,166 B2 | 1/2005 | Phillips et al. | |
| 7,416,688 B2 | 8/2008 | Pfaff et al. | |
| 7,716,522 B2* | 5/2010 | Hanai | G06F 11/2097 709/205 |
| 7,850,077 B2 | 12/2010 | Talwerdi et al. | |
| 8,243,356 B2 | 8/2012 | Robertsson et al. | |
| 8,264,529 B2* | 9/2012 | Goulart | H04N 21/2387 348/14.02 |
| 8,659,650 B2 | 2/2014 | Mugica et al. | |
| 8,940,189 B2 | 1/2015 | Krietsch et al. | |
| 2003/0028588 A1* | 2/2003 | McConnell | G09B 7/00 709/203 |
| 2005/0139681 A1 | 6/2005 | Premjeyanth et al. | |
| 2006/0082458 A1* | 4/2006 | Shanks | G06K 7/0008 340/572.4 |
| 2008/0148059 A1 | 6/2008 | Shapiro | |
| 2008/0259155 A1* | 10/2008 | McLelland | H04N 7/147 348/14.03 |
| 2009/0034717 A1* | 2/2009 | Giraud | G06F 7/723 380/28 |
| 2009/0152356 A1 | 6/2009 | Reddy et al. | |
| 2011/0007143 A1* | 1/2011 | Mugica | G06K 9/00885 348/77 |
| 2012/0084557 A1* | 4/2012 | Futa | G06F 21/55 713/156 |
| 2013/0082105 A1 | 4/2013 | Schützmann et al. | |
| 2013/0169815 A1* | 7/2013 | Carney | H04L 63/0853 348/156 |
| 2014/0291495 A1 | 10/2014 | Fischer et al. | |

FOREIGN PATENT DOCUMENTS

| | | |
|---|---|---|
| EP | 1046692 | 10/2000 |
| EP | 1213338 | 6/2002 |
| EP | 2402401 | 1/2012 |
| EP | 2220171 | 3/2014 |
| WO | 1997023846 | 7/1997 |
| WO | 2000070536 | 11/2000 |
| WO | 2001024106 | 4/2001 |
| WO | 2002073250 | 9/2002 |
| WO | 2003000801 | 1/2003 |
| WO | 2004097716 | 11/2004 |
| WO | 2006063926 | 6/2006 |
| WO | 2007060133 | 5/2007 |
| WO | 2007131833 | 11/2007 |
| WO | 2008083894 | 7/2008 |
| WO | 2009121605 | 10/2009 |
| WO | 2012001077 | 1/2012 |
| WO | 2013045082 | 4/2013 |
| WO | 2013120590 | 8/2013 |
| WO | 2013135339 | 9/2013 |
| WO | 2013159862 | 10/2013 |
| WO | 2013159863 | 10/2013 |
| WO | 2014021721 | 2/2014 |
| WO | 2014180840 | 11/2014 |

OTHER PUBLICATIONS

Colorimetry—Part 4: CIE 1976 L *a*b* Colour space, Cielab (1976) system (17 pages), Sep. 16, 2019.
Magnetic materials—Part 1: Classification, IEC60404-1 (2000), 118 pages.
International Search Report, Written Opinion and International Preliminary Report on Patentability issued with respect to application No. PCT/EP2016/057751.

* cited by examiner

MOBILE, PORTABLE APPARATUS FOR AUTHENTICATING A SECURITY ARTICLE AND METHOD OF OPERATING THE PORTABLE AUTHENTICATION APPARATUS

FIELD OF THE INVENTION

The present invention relates to a portable apparatus for authenticating a security article and a field deployable method of authenticating a security article. More particularly, the present invention relates to availability in the field to perform any one of determining whether a security article is genuine, determining whether a user of a security article is authorized, and/or identifying such a user.

BACKGROUND OF THE INVENTION

Currently, fixed equipment is installed at established border crossings, transportation hubs (such as airports), customs offices and other established locations for authenticating security articles, such as identification documents and documents permitting access to a particular area such as a geographical area, and for identifying a user of such security articles to assess whether the user is an authorized user of the article and to assess whether the user is permitted to access the particular area. However, such fixed equipment is not available for mobile deployment in the field where it is also desired to confirm the validity of a security article, the identity of an individual, whether an individual is the authorized user of the security article, and/or whether an individual is permitted to access a particular area.

Security articles are usually protected by several layers of different security elements or features, which are chosen from different technology fields, manufactured by different suppliers, and embodied in different constituting parts of the security article. To break the protection of the security article, the counterfeiter would need to obtain all of the implied materials and to get access to all of the required processing technology, which is hardly an achievable task. Security features, e.g. for security articles, can generally be classified into "covert" security features and "overt" security features. The protection provided by "covert" security features relies on the concept that such features require specialized equipment and knowledge for detection, whereas "overt" security features rely on the concept of being detectable with the unaided human senses.

U.S. Pat. No. 8,659,650 to Mugica et al. discloses a portable apparatus for biometric and biographic data collection. The apparatus of Mugica et al. is disclosed as including any of: a portable computer having an integrated communication device; a lower casing that is lockable and ruggedized in accordance with a military standard; a fingerprint reader; a palm reader; a signature pad; a vein pattern scanner; a credential printer; a receipt printer; a smartcard reader; a RFID reader; a barcode reader; a magnetic strip reader; a passport or ID reader; a MRZ code reader; an optical reader; a keypad; a webcam; a digital camera; a video camera; an iris capture device; an iris scanner; and lateral lighting sources for illuminating the subject to be imaged by the camera. The brightness of the lighting sources are adjustable. The camera is mounted on an attachment portion and a secondary pivot portion that allow the camera to be tilted through 180 degrees in each direction relative to the horizontal plane and to pan sideways through 135 or 180 degrees in the clockwise or counterclockwise direction. A people registration module of the apparatus of Mugica et al. controls operations of peripherals including: acquiring images; acquiring fingerprints; analyzing fingerprint quantity and quality; printing enrollment receipts; printing ID cards; turning lights on and off; and acquiring iris images.

However, the apparatus of Mugica et al. is not operable to confirm the authenticity of a security article, whether an individual is the authorized user of the security article, and/or whether an individual is permitted to access a particular area. Furthermore, the apparatus of Mugica et al. lacks a full complement of security features necessary to safeguard the operator of the apparatus of Mugica et al. and the individual from which biometric and biographic data is being collected by the apparatus of Mugica et al.

It is therefore an object of the present invention to provide a portable and tamper-resistant apparatus and a field deployable method for authenticating a security article so as to assess whether the security article is genuine and to determine whether the user is an authorized user of the security article. Preferably, the portable apparatus and field-deployable method of the present invention are improved with regard to one or more of safety, reliability, speed, cost, ease of operation, and automation.

SUMMARY OF THE INVENTION

The mentioned objects and problems are solved by the subject-matter of any independent claim. Further preferred embodiments are defined by the dependent claims.

According to one embodiment of the present invention, there is provided a mobile, portable apparatus for authenticating, verification and certification of a security article. The apparatus comprises: (a) an enclosure securely housing components of the device; (b) an authentication device operable to authenticate the security article; (c) a power source, preferably of solar type, different types of batteries, uninterruptable power supply, different type of charging facilities and or any source of energy; (d) an imaging device for simultaneously imaging in opposing and/or multiple directions; (e) a programmable and configurable control panel; (f) an information processing unit; and (g) a printing device for printing and/or special marking on the security article; wherein the imaging device is portably coupled to the authentication device, and wherein the control panel is arranged as an interface command and control center connected to a processing board between the information processing unit and the other components of the apparatus.

Portably coupled according to the invention means, that extra power source can be connected to the unit for extended life of the operation without a need for plugin to external source of power. The extended battery source is mounted inside a compartment as part of the carrying device that can be mounted to the unit for easy movement of the unit.

The mobile apparatus according to the invention is suitable to be used in the field. Authentication and printing can be done securely without the need of any further of infrastructure. Further to this, by having an interface board, the apparatus becomes safer in case of tampering attacks. The preferably multi-language control panel and interface board facilitate the communication between each component integrated in the unit and the processing computer. The interface board is the main "brain" that encrypts and communicates between different components. It also eliminates the needs for third party software and drivers by managing the communication between each component and the processing unit. The interface board also manages the tampering and self-destruction management of the information in terms of compromising the unit by unauthorized individuals. In other words, the interface board, manages the communication between the components securely, monitor and manage the required activities in case of tampering the unit such as destructive activities to erase safely the data and programs, attempt to transfer as much information as possible on the individual who has attempted to temper the unit by sending either picture or signals, manages the location of the unit and blending of different class of information into one data set such as operator ID with the captured data by the said operator.

The printer in a device according to the invention may be a dynamic authentication stamp printer. The product to be printed might be a passport, a certificate, visa, etc. The authentication device may be an authentication stamp printer. The printer may include a pair of parallel, spaced-apart rollers for guiding an object to be printed on. The printer may include a backstop for contacting an edge of the object to be printed on. The backstop may be moveable to guide the object to be printed on. The printer should preferably be suitable to print booklets as well as stack of paper or single sheets with different thicknesses.

The enclosure or housing is dimensioned for supporting components of the authentication device. The enclosure may be dimensioned for containing the authentication device. The enclosure may be portable.

The power source might be any kind of power source like e.g. solar panel, any kind of battery, rechargeable or not, a charging facility such as car cigarette lighter and/or, any source of energy such as AC.

According to a preferred embodiment of the invention, the control panel comprises a processing circuit and a memory circuit of any kind such as erasable, none erasable, erasable and rewritable, etc. Further, the information processing unit might be a computing device.

The enclosure may include a handle for portability. The enclosure may be configurable into each of a closed configuration and an opened configuration. The enclosure may be dimensioned to contain the authentication device within an interior of the enclosure. The enclosure may further comprise a handle, one or several wheels and/or a lock. The enclosure may be attached to a removable battery carrying case for a second battery unit. This Unit might be equipped with wheels to make the unit mobile on wheels. In this case the wheels are not built as part of the enclosure. Therefore, wheels are accessories and not necessarily part of the case.

The imaging device may further comprise an imaging support member, wherein the imaging support member is positionable to permit the imaging device to capture, preferably simultaneously, images of an operator of the apparatus and an individual located at another position, like e.g. substantially on the opposite side or on any side or position that the imaging device could focus. The imaging device might include a capturing device, that can be the guidance for the focusing of the imaging device to capture the images. Like this, sound or noise acts as the direction of the event so the imaging device or camera, respectively, could move to that direction and capture the image. The camera focuses on the direction where noise happens to capture as much of evidence as possible. The sound or noise level could be programmed into the unit inside, the interface board.

According to another preferred embodiment the imaging device may be operable to simultaneously capture images providing a 360 degree view. The imaging device may be operable to simultaneously capture images providing a 360 degree view around the apparatus when the enclosure is in its opened configuration. The imaging device could be a single device with ability to capture large angels of view or consists of multiple imaging lenses to cover 360 degree angel with moving arms to mechanically moves up or down with support member may be coupled to the housing. The imaging device support member may be coupled to the enclosure at its interior. The imaging device support member may be positionable when the enclosure is in its opened configuration to permit the imaging devices to simultaneously capture images in opposing directions. The imaging device could also be multiple imaging devices. Like this a imaging for surveillance, i.e. monitoring of the events as it happens so it can relay to the head office to protect operator, and use as evidence of proper activities. The imaging device might be able to couple with sound and or video signals to enhance and complement the protection of the operator, data, system and/or combination of all the above.

The imaging device support member may be positionable to permit the imaging device to simultaneously capture images of an operator of the apparatus and an individual or several individuals/subjects located on the opposite side of the apparatus from the operator of the apparatus. Like this not only the individual situated before the operator might be surveilled by image capture, but also the operator. For such a preferred embodiment of the invention the apparatus further comprises an image and/or voice recording. Voice recognition could be used for detection of the subject that is responding to officer, or operator voice recognition for automatic feed on information. Voice recording can also be used for capturing of communication between the operator and the subject to make sure the evidence of the process is recorded to avoid abuse or possibly use evidence in the court. Similar to new police cars that are capturing the video and audio during service. The voice detection device could be the guidance for the focusing of the imaging device, recorded locally or transfer via one of the communication methods live or combination of both. The first plurality of imaging devices may be operable to capture images of the use of the authentication device. The imaging device support member may be positionable when the enclosure is in its opened configuration to permit the first plurality of imaging devices to capture images of the use of the authentication device. The imaging device support member may be positionable when the enclosure is in its opened configuration to permit the imaging device to capture images of the use of a device associated with the apparatus. The apparatus may include a second imaging device operable to capture images of the use of the authentication device when the enclosure is in its said opened configuration.

The apparatus may include a plurality of the authentication devices. One or more imaging devices may be hidden. One or more imaging devices may be camouflaged. Some of the imaging devices might be hidden cameras to protect the unit or sections of the units. These hidden cameras might also provide evidence of tampering the unit. The imaging device support member may be rotatably coupled to the enclosure. The imaging device support member may be coupled to the enclosure. The imaging device support member may be resiliently coupled to the enclosure. The imaging device support member may be positionable in a storage position disposed within the interior of the enclosure. The imaging device support member may be positionable in an operational position projecting from the enclosure when the enclosure is in its opened position. The imaging device support member may be operable to automatically move from its storage position to its operational position when the enclosure is moved by the operator from its closed position to its opened position. The first plurality of imaging devices may be operable to capture images of the operator while the operator is moving the enclosure from its closed position to its opened position.

As mentioned already, the enclosure may be lockable. The enclosure may include a lock. The enclosure may be tamper-resistant. The enclosure may include a tamper sensor for sensing tampering of the enclosure. The tamper sensor may include a plurality of electrically powered wires and electrical circuitry for determining whether one of the electrically powered wires is cut. The plurality of electrically powered wires may be disposed along the interior surface of the enclosure. The plurality of electrically powered wires may be hidden by a cover. The cover may be made of a fabric material. The tamper sensor may include a motion sensor.

The apparatus may include an information processing unit. The information processing unit may be a computer. The information processing unit may include a communications module. The apparatus may include a communications device. The apparatus may include a personal communications device docking station. The information processing unit may include a first display. The apparatus may include a second display. The information processing unit may include a first operator input device. The apparatus may include a second operator input device.

The apparatus may include the authentication device. The apparatus may include a passport reader. The authentication device may be a passport reader. The authentication device may be a source of electromagnetic radiation for illuminating an object. The source may be operable to produce ultraviolet (UV) light. The source may be operable to produce infrared (IR) light. The source may be operable to produce visible light. The authentication device may include a mirror for redirecting the visible light, so as to provide upwardly directed light.

The apparatus may include a biometric device. The authentication device may be the biometric device. The biometric device may be a fingerprint reader. The biometric device may be rotatably coupled to the enclosure. The biometric device may be rotatable between a biometric device storage configuration and a biometric device operational position. The biometric device may be adjacently external to the enclosure when in its biometric device operational position.

The apparatus may include a battery. The apparatus may include a solar panel for supplying electrical power to the apparatus. The apparatus may include a battery charger for charging the battery. The solar panel may be operable to supply electrical power to the battery charger. The apparatus may include an externally accessible power receptacle accessible from the outside of the enclosure for receiving electrical power. The apparatus may be operable to charge the battery using electrical power received from the external power receptacle. The apparatus may include an externally viewable status indicator that is viewable from the outside of the enclosure. The externally viewable status indicator may indicate a charge status of the battery.

The apparatus may include an auxiliary battery holder. The auxiliary battery holder may include a pair of wheels. The auxiliary battery holder may include a handle. The apparatus may include a plurality of legs. The apparatus may include a telescoping leg. The apparatus may include a folding leg. Each leg may be a telescoping leg. Each leg may be a folding leg.

The apparatus may further comprise a communications module for communication with remote infrastructure, like e.g. a server.

According to another preferred embodiment of the invention the apparatus further comprises a light source, preferably UV-light and/or visible light, external of the passport reader. These light sources, are preferably mounted inside the cover and help the officers/operator to manually and visually check the features of a document such as UV features and water mark like for example in the ID page of a passport, currency or any ID or security and value document.

In accordance with another aspect of the invention, there is provided a method of operating a portable authentication apparatus for authenticating a security article as defined above. The method involves (a) determining preferably reiteratively, in an opened configuration of an enclosure of the apparatus, whether a registered operator of the portable authentication apparatus is verified and/or in proximity; and (b) permitting and/or maintain access to an authentication device of the portable authentication apparatus if the registered operator is verified and/or in proximity.

According to a preferred embodiment of the invention the verification of the operator occurs by proximity sensor, images and/or biometrics. Instances of tampering may be detected by a motion sensor and/or electrically powered wires.

According to another preferred embodiment of the invention upon detection of tampering, stored data software, solutions and/or codes existing and operating on the device will be transmitted and/or deleted and/or components of the device are inactivated. The device will be configurable to operate with or without the live communication to another similar or different device such as server or a computing device remotely monitor the activities of each device.

As another measure in case of detection of a tampering attack, the control panel will be deactivated or self-destruct all the sensitive components, data and programs.

Further software, solutions, codes, data stored on the device might be transmitted and/or deleted and/or components of the device inactivated. Therefor the control board or interface could be configured via sensors and/or protecting shields embedded in the enclosure. A tampering attempt might be detected by sound detectors that are sensible within a defined range, such as explosion level, voice detection detecting the operator's voice is not correct, live-images that are transferred to a center. These detections could cause a remote signal from a center or other devices monitoring. Further it could be detected that encryption is in a wrong format and/or a wrong encrypted key is used which might even cause a self-destruction action to be activated.

Further it is provided a method of operating a portable authentication apparatus. The method involves: (a) determining whether a registered operator of the portable authentication apparatus is verified; and (b) permitting access to an authentication device of the portable authentication apparatus if the registered operator is verified. Determining whether the registered operator of the portable authentication apparatus is verified may involve determining whether a registered operator of the portable authentication apparatus is verified when the portable authentication apparatus comprises an authentication device operable to authenticate a security article. Determining whether the registered operator of the portable authentication apparatus is verified may involve determining whether a registered operator of the portable authentication apparatus is verified when the portable authentication apparatus comprises a first plurality of imaging devices for simultaneously imaging in opposing directions. Determining whether the registered operator of the portable authentication apparatus is verified may involve determining whether a registered operator of the portable authentication apparatus is verified when the portable authentication apparatus comprises an authentication device operable to authenticate a security article, and a first plurality of imaging devices for simultaneously imaging in opposing directions, the first plurality of imaging devices being portably coupled to the authentication device.

Determining whether the registered operator of the portable authentication apparatus is verified may involve detecting an opening of the portable authentication apparatus. Detecting an opening of the portable apparatus may involve detecting an opening of a portable case of the portable authentication apparatus. Determining whether the registered operator of the portable authentication apparatus is verified may involve verifying the proximity of the registered operator. Verifying the proximity of the registered operator may involve measuring the proximity of the registered operator by a proximity sensor of the portable authentication apparatus. Verifying the proximity of the registered operator may involve causing a telephone call to a mobile phone of the registered operator. Verifying the proximity of the registered operator may involve denying access to features of the portable authentication apparatus. Determining whether the registered operator of the portable authentication apparatus is verified may involve verifying the image of the registered operator. Verifying the image of the registered operator may involve capturing by a camera of the portable authentication apparatus an image of an operation scene. Verifying the image of the registered operator may involve causing a telephone call to a mobile phone of the registered operator. Verifying the image of the registered operator may involve denying access to features of the portable authentication apparatus. Determining whether the registered operator of the portable authentication apparatus is verified may involve verifying a biometric of the registered operator. Verifying a biometric of the registered operator may involve measuring a biometric of an operator of the portable authentication apparatus. Verifying a biometric of the registered operator may involve causing a telephone call to a mobile phone of the registered operator. Verifying a biometric of the registered operator may involve denying access to features of the portable authentication apparatus.

The method may involve monitoring the proximity of the registered operator. The method may involve monitoring the image of the registered operator. The method may involve detecting a closure of the portable authentication apparatus. The method may involve detecting a closure of the portable case. The method may involve denying access to features of the portable authentication apparatus. In accordance with another aspect of the invention, there is provided a system for operating a portable authentication apparatus. The system includes the portable authentication apparatus; and a remote server operable to communicate with the portable authentication apparatus.

In accordance with another aspect of the invention, there is provided a system for authenticating a security article. The system includes a portable authentication apparatus; and a remote server operable to communicate with the portable authentication apparatus.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION OF EMBODIMENTS

A portable apparatus for authenticating a security article includes: (a) authentication means for authenticating the security article; and (b) imaging means for simultaneously imaging in opposing directions, wherein the imaging means is portably coupled to the authentication means. The apparatus may include enclosure means for containing the authentication means and the imaging means.

Figure 1:
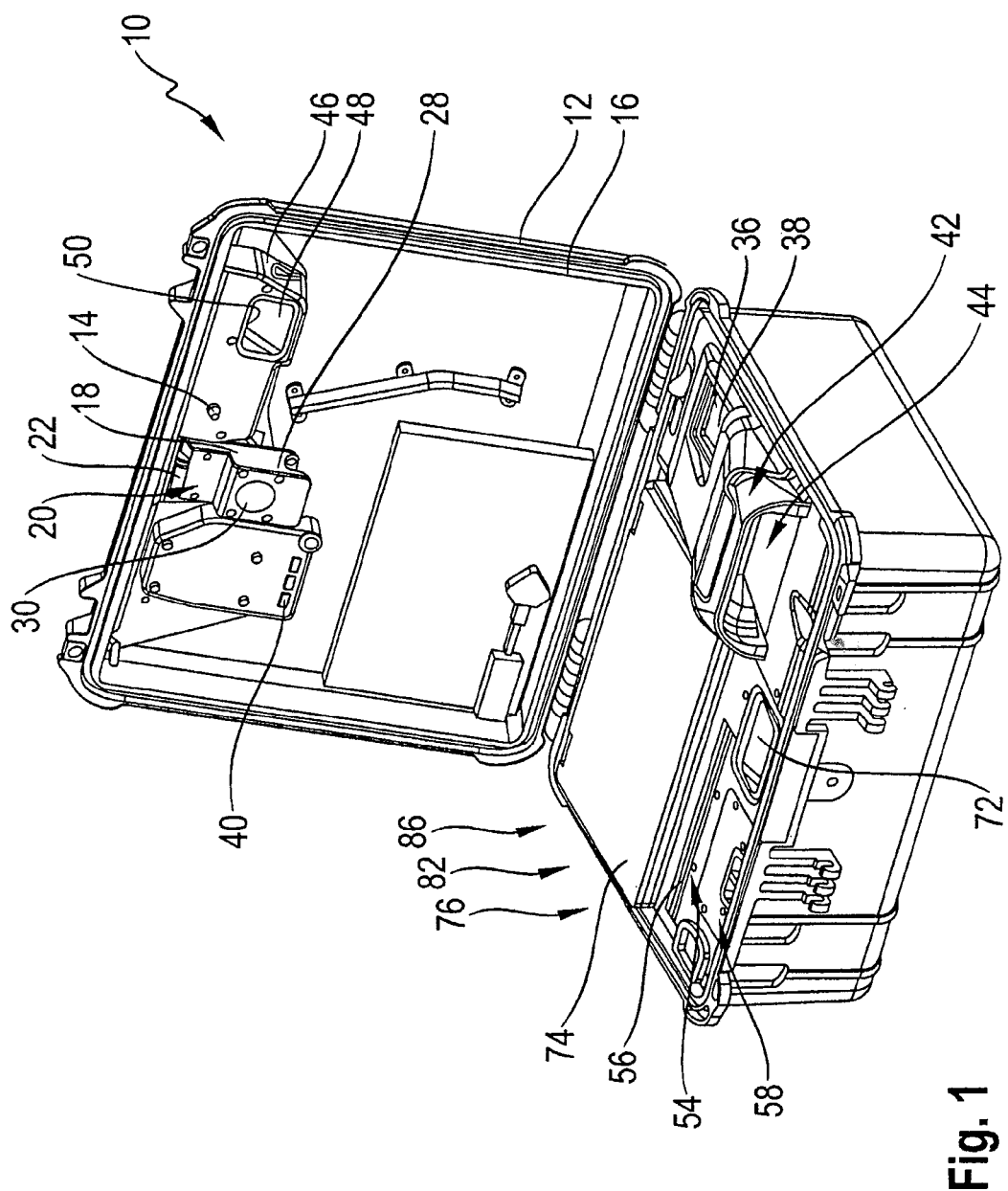
FIG. 1 is a perspective view of a portable apparatus for authenticating a security article according to a first embodiment of the invention.
Figure 2:
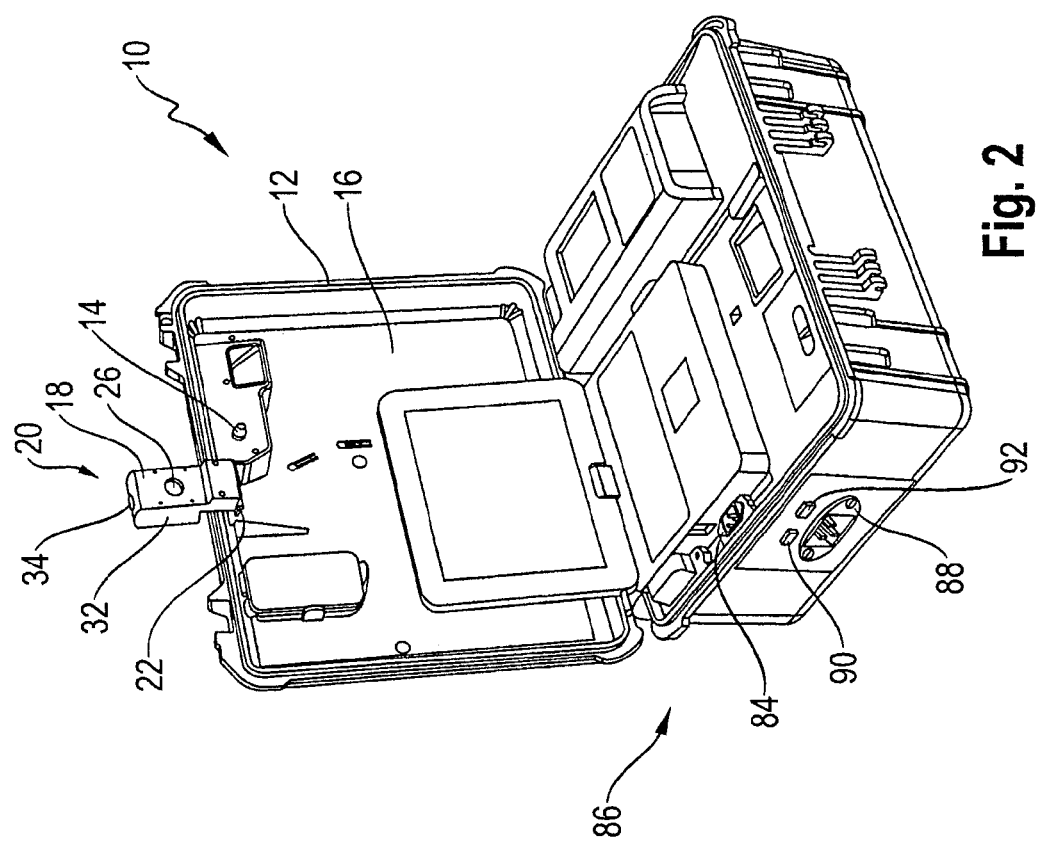
FIG. 2 is a perspective view of the portable apparatus shown in FIG. 1, showing a power receptacle.

Referring to FIGS. 1 and 2, the apparatus according to a first embodiment of the invention is shown generally at 10. The apparatus 10 is self-contained and readily portable by a single human carrying the apparatus. The apparatus 10 is useable for any one or more of the following functions: to authenticate a security article, to determine whether a security article is genuine, to determine the identity of an individual, to determine whether a security article user is an authorized user of the security article, to determine security credentials of a security article user, to determine an authorization level of a security article user, to determine whether a security article user is permitted to access a particular area, to print an authentication stamp on a security article, to print an authentication certificate, and related functions.

A security article is generally defined as an article that includes at least one security feature intended to protect the security article against counterfeit or fraud. Examples of security articles include without limitation documents of various sizes, documents having specific known dimensions, bound documents, booklet-type documents, unbound documents, sheet-like documents, single-sheet documents, card-like documents and cards. Examples of document-type security articles include without limitation passports; identity cards; visas; driver's licenses; identification badges, such as used by employees; financial transaction cards such as bank cards, credit cards and transaction cards; access documents or cards; entrance tickets; public transportation tickets or titles; birth certificates; health cards permitting an individual to obtain medical services; and the like. In some circumstances, a security article may be any item of value protected against counterfeit or fraud. Examples of value-item type security articles include without limitation bank notes; diplomas; certificates, such as academic certificates and stock certificates; memorabilia; and artwork such as paintings. A security article may include an electronic processor and/or electronic storage medium, such as in the case of a smart card. A security article may include a machine-readable zone (MRZ) for displaying machine readable information encoded in accordance with a standard code.

The security features present on and/or in the security article described herein may be a covert security feature, an overt security feature or an overt and covert security feature. The security feature present on and/or in the security article described herein may consist of a serial number; a printed text, a printed pattern, a designs or code made of a security ink; an intaglio printed pattern or design; a security thread or stripe; a window; fibers; planchettes; a foil; a decal; a hologram; microprinting; a 3-D security ribbon; and/or watermarks. The printed text described herein may be biographic information associated with the security article user (not shown) or a part thereof, biometric data associated with the security article user or a part thereof, and/or the machine readable zone (MRZ) or part of it. The security features present on and/or in the security article described herein are machine readable security features. As used herein, the term "machine readable security feature" refers to a security feature which exhibits at least one distinctive physical property which may be measured with the use of a security feature detector. Machine readable security features comprise at least one machine readable substance, wherein said machine readable substance refers to a material that bears information which may be measured when using a security feature detector. Examples include machine readable security features which can be admixed to or comprised in an ink or composition so as to confer a way to authenticate said ink/composition or article comprising said ink/composition by the use of the particular security feature detector for its authentication. In general, however, the physical property of the security feature described herein may be selected from the group consisting of optical properties, magnetic properties, conductivity properties, substrate composition properties and combinations thereof. An example of a substrate composition property is a fiber distribution pattern, such as that disclosed in U.S. Pat. No. 7,850,077 which is incorporated herein by reference.

Still referring to FIGS. 1 and 2, the apparatus 10 in the first embodiment includes an housing, such as the portable case 12 shown in FIGS. 1 and 2, for containing one or more authentication devices (described in more detail below). Typically, the portable case 12 is rotatable between a closed position and the opened position shown in FIGS. 1 and 2. In the first embodiment, the apparatus 10 includes a sensor 14 for indicating whether the portable case 12 is in its closed or opened position. The sensor 14 may operate in the manner of a refrigerator door light switch, for example. The portable case 12 is preferably lockable when closed. Preferably, the portable case 12 meets known industrial and/or military standards for ruggedness, durability, watertightness, other known characteristics, or any combination thereof for example. The portable case 12 may be made of any suitable material or material combination, including for example one or more metal(s), e.g. steel, aluminum, titanium; plastics; fiber enforced plastics; ceramics: and the like.

The portable case 12 in some embodiments is tamper-resistant. In some embodiments, the portable case 12 may include a liner 16 extending around the entire inner surfaces of the portable case 12, including its lid portion, for detecting instances of tampering. The liner 16 is preferably at least partly covered by fabric (as shown in FIGS. 1 and 2) to conceal this tamper-detection feature and for aesthetic purposes. In some embodiments, the liner 16 section disposed along the lower portion of the portable case 12 and the liner 16 section disposed along the lid of the portable case 12 overlap when the portable case 12 is in its closed position. In the first embodiment, the liner 16 includes a number of electrical wires extending substantially in parallel to each other, which may be held together in the form of a ribbon cable for example. In some embodiments, multiple liners 16 or liner 16 sections are employed. For example, multiple liner 16 sections may be overlapped to produce a grid of electrical wires. The electrical wires are not in electrical contact with each other. A low-voltage electrical supply is attached to the electrical wires, such as by attaching opposing ends of each wire to opposing-voltage terminals of the low-voltage electrical supply. The apparatus 10 includes electronic circuitry for measuring the electrical resistance of each wire, electrical current through each wire and/or the voltage present at each wire so as to detect a broken wire that is causing an electrical open circuit, thereby advantageously permitting the detection of an attempt to drill into the portable case 12 from the outside or otherwise tamper with the portable case 12. In some embodiments, the apparatus 10 includes an internal motion sensor for detecting tampering attempts. In some embodiments, the apparatus 10 is operable to count automatically the number of failed attempts at opening a lock of the portable case 12, and may be programmed to transmit and/or delete currently stored data upon a specifiable number of failed attempts to open the portable case 12.

In the first embodiment shown in FIGS. 1 and 2, the apparatus 10 includes an imaging device housing 18 for housing a plurality of imaging devices, such as the imaging device set 20 shown in FIGS. 1 and 2. In the embodiment shown in FIGS. 1 and 2, the imaging device housing 18 is rotatably connected to the portable case 12 by the hinge 22. FIG. 1 shows the imaging device housing 18 in a storage position, and FIG. 2 shows the imaging device housing 18 in an operational position. In the embodiment shown in FIGS. 1 and 2, the imaging device housing 18 is rotatable about the hinge 22 to any angle between the storage and operational positions, and may be manually rotated by an operator (not shown) of the apparatus 10, such as during set-up of the apparatus 10. In some embodiments, the imaging device housing 18 is resiliently biased to a particular position such as the operational position. In such embodiments, the imaging device housing 18 may be operable to automatically move from its storage position (FIG. 1) to its operational position (FIG. 2) when the portable case 12 is opened. In some embodiments, the imaging device housing 18 is electrically powered and is thereby operable to automatically move into the operational position when actuated and/or upon opening of the portable case 12 to a sufficient degree. In some embodiments, the imaging device housing 18 is connected to the portable case 12 via a swivel-type and/or an articulated connection (not shown) to permit the imaging device housing 18 to assume a variety of positions at various angles. In some embodiments, the imaging device housing 18 has a curved surface (not shown), such as by having a spherical, bulbous or otherwise rounded shape, while containing multiple cameras pointing in different directions.

In the first embodiment, the imaging device set 20 includes at least two imaging devices, such as the camera 24 (FIG. 1) and the camera 26 (FIG. 2), for simultaneously imaging in opposing directions. The apparatus 10 is operable to image simultaneously in opposing directions by having both cameras 24 and 26 in an operational state at the same time, thereby advantageously facilitating the monitoring and collection of a visual record of the interaction between the operator of the apparatus 10 and a security article user, who are typically located on opposite sides of the apparatus 10.

In some embodiments, the imaging device set 20 includes additional imaging device(s) such as any one or more of the camera 28 (FIG. 1), camera 30 (FIG. 1), camera 32 (FIG. 2), and camera 34 (FIG. 2). In some embodiments, the imaging device set 20 is operable to capture images of the use of apparatus 10, including capturing images as the portable case 12 is being opened. In some embodiments, the imaging device set 20 is operable to capture images of the use of one or more authentication devices of the apparatus 10. In some embodiments, the imaging device set 20 is operable to capture images of an individual using one of the authentication devices of the apparatus 10, thereby facilitating the monitoring and collection of a visual record of the use of the authentication device so as to further validate any resulting authentication of the individual (who may be the security article user). In some embodiments, the imaging device set 20 is operable to capture images surrounding a 360 degree view, such as a generally horizontal 360 degree view around the apparatus 10, to advantageously facilitate the monitoring and collection of a visual record of the operator of the apparatus 10 and all other individuals surrounding the apparatus 10 who are potentially interacting with the operator of the apparatus 10. In some embodiments, the imaging device set 20 is operable to capture images of attempts to open the portable case 12, including being operable to detect events of tampering with the apparatus 10.

The apparatus 10 in the first embodiment is operable to detect a biometric feature of an individual such as the security article user, the operator of the apparatus 10, a maintenance or repair technician of the apparatus 10, and the like. For example, the imaging device set 20 in the first embodiment is operable in the manner of an authentication device to capture image(s) for subsequent, including immediate, image processing to obtain biometric data associated with individual(s) in proximity to the apparatus 10. For example, the imaging device set 20 may be operable to capture image(s) of part(s) of the body for visual or geometric recognition, such as image(s) of a face, iris, retina, ear lobes (outer ear), finger(s), hand(s), veins or other body part. In some embodiments, the imaging device set 20 is operable to capture images of the movement of the security article user or other individuals, which may be used to recognize a gait for gait analysis or for other behavioral analysis. In variations, the imaging device set 20 may be operable to capture one or both of still photographs and videos, for example. In variations, any one or more of the cameras 24 to 34 may be programmable, remote controllable or any combination thereof for example.

In some embodiments, the apparatus 10 includes one or more additional cameras (not shown) separate from the imaging device set 20. For example, the apparatus 10 includes in some embodiments a camera directed specifically for capturing images of the space between the lower section and upper section (i.e. lid) of the portable case 12, so as to capture images of the individual who is opening the portable case 12 as soon as possible when the portable case 12 is being opened.

Still referring to FIGS. 1 and 2, the apparatus 10 in the first embodiment includes as an authentication device a biometric scanner, such as the fingerprint reader 36 shown in FIGS. 1 and 2. In the first embodiment, the fingerprint reader 36 has a fingerprint reader window 38 dimensioned for receiving multiple fingers of a hand. In some embodiments, the fingerprint reader 36 shown in FIGS. 1 and 2 operates as or is replaceable with a palm-print reader, for example. In the first embodiment, the fingerprint reader 36 is operable to generate a code in response to its reading operation. The code generated by the fingerprint reader 36 may be used by the apparatus 10 in the manner of a passcode for the operator of the apparatus 10, for example, to permit or deny operation of any or all of its functions and/or permit or deny access to any feature of the apparatus 10. Additionally or alternatively, the code generated by the fingerprint reader 36 may be used by the apparatus 10 for identifying an individual, such as the security article user for example, and for confirming the identity of the individual by comparison with other identifying indicia determined by or otherwise available to the apparatus 10. While the fingerprint reader 36 of the first embodiment is preferably dimensioned for receiving and supporting finger(s), and is preferably operable to biometrically scan finger(s), in general any other suitable biometric data can be acquired through the biometric scanner of the apparatus 10 (e.g. by means of a camera positioned behind the reader window 38). In variations, the apparatus 10 may include a biometric data capturing device in any other suitable form as a biometric scanner or a biometric reader (not directly shown in FIGS. 1 and 2) that may employ some kind of housing aperture as, for example, in the form of the window 38 shown and described for the fingerprint reader 36.

Additionally or alternatively, the apparatus 10 may include a palm-print reader, a pulse oximeter to capture blood oxygen levels, an odor detector, a monochrome charge coupled device (CCD) array to capture infrared images of veins when illuminated with near infrared light for vascular analysis, ultrasound transducers for capturing bone density, and any required equipment for acquiring biometric data associated with a desired type of biometric information.

In the first embodiment, the apparatus 10 includes a microphone 40 for capturing audio information in the vicinity of the apparatus 10, thereby advantageously facilitating the monitoring and collection of an audio record of the interaction between the operator of the apparatus 10 and the security article user and/or other individuals. In the first embodiment, the apparatus 10 is operable to record audio data, store the audio data, and delete the audio data in accordance with operator instructions for example. In some embodiments, the microphone is hidden from view. In some embodiments, the apparatus 10 is operable to perform voice recognition.

Still referring to FIGS. 1 and 2, the apparatus 10 in the first embodiment includes as an authentication device a security article scanner, such as the passport reader 42 shown in FIGS. 1 and 2. The passport reader 42 of the first embodiment includes a slot 44 for receiving and subsequently ejecting a passport or other security article. In some embodiments, the passport reader 42 includes a second slot (not shown) separate from the receiving slot 44 for ejecting the security article. In the first embodiment of FIGS. 1 and 2, the passport reader 42 is dimensioned to receive a passport opened to its identification page and detect one or more security features associated with the passport. In variations, the passport reader 42 is dimensioned to receive at its slot 44 a paper document (e.g. ticket, custom clearance form or other travel document, birth certificate), a card which may be a plastic card (e.g. driver's license, identification card, credit or debit card), a booklet, other document, other security article, or any combination thereof for example. Usually these passport, ID or any valued document reader capture holders photograph if any and data in biographic and biometric format from the existing RFID chips or pattern recognition of the said document. Further preferably the passport or valued document inspection is done under different light sources, like e.g. daylight, UV-light (ultraviolet) and/or IR-light (infra-red). This can be a good tool to check the variable holder's UV color information, IR for some tampering marks and authenticity of the inks or other security that could be used IR.

In some embodiments, the passport reader 42 may have functionality disclosed in U.S. Pat. No. 7,850,077 and/or WO 2014180840, each of which is incorporated herein by reference.

Still referring to FIGS. 1 and 2, the apparatus 10 in the first embodiment includes as an authentication device the illumination device 46 shown in FIGS. 1 and 2. The illumination device 46 is preferably operable to produce electromagnetic radiation in the visible and UV ranges of the electromagnetic spectrum. In particular, the illumination device 46 is operable to illuminate the security article with various forms of light so as to render visible or highlight security features of the security article. The illumination device 46 in the embodiment shown in FIGS. 1 and 2 includes a mirror 48, which is typically a flat mirror 48 disposed at an upward angle (when the portable case 12 is in its opened position) and located beneath a source 50 (not directly visible in FIGS. 1 and 2) of visible (e.g. white) light. The position and location of the mirror 48 advantageously provides visible light backlighting to a security article (e.g. bank note) placed in suitable proximity in front of the illumination device 46 above the mirror 48, thereby facilitating the visual inspection of the security article and its security features (e.g. watermark).

In some embodiments, the angle of the mirror 48 is adjustable under manual and/or electronic control. In some embodiments, either one or both of the brightness and color of the visible light source 50 is adjustable under manual and/or electronic control.

The illumination device 46 of the first embodiment also includes a source 52 (not directly visible in FIGS. 1 and 2) of UV radiation directed downwardly (when the portable case 12 is in its opened position) from the illumination device 46, thereby advantageously directing the UV radiation away from the eyes of individuals while providing UV illumination of a security article placed in suitable proximity in front and slightly below the illumination device 46.

In some embodiments, the apparatus 10 is operable to capture image(s) of a security article placed in proximity to the illumination device 46, such as by the imaging device set 20 including at least one camera positioned to capture images of a security article of typical dimensions placed in proximity to the illumination device 46. Additionally or alternatively, image(s) of a security article placed in proximity to the illumination device 46 may be captured by one or more additional cameras (not shown) of the apparatus 10 that are separate from the imaging device set 20.

In general, the illumination device 46 may be operable to produce and emit electromagnetic energy within any one or more ranges of wavelengths of the electromagnetic spectrum, such as hard x-ray (HX) radiation, soft x-ray (SX) radiation, extreme ultraviolet (EUV) radiation, near ultraviolet (NUV) radiation, light within the visible region of the electromagnetic spectrum, near infra-red (NIR) radiation, mid-infra-red (MIR) radiation, far infrared (FIR) radiation, and any combination thereof.

In the first embodiment, each of the sources 50 and 52 includes one or more light emitting diodes (LEDs) for producing the respective illumination. In general, the illumination device 46 may include any suitable source(s) of electromagnetic energy, including LED, direct chemical light sources, incandescent light sources, gas or other discharge-based lighting sources, x-ray emitters, solid state sources, lasers, and any combination thereof for example.

In variations, any one or more of the angle, brightness and other features of the source 52 may be adjustable under manual and/or electronic control.

Still referring to FIGS. 1 and 2, the apparatus 10 in the first embodiment includes as an authentication device the printer 54. The printer 54 may be of any suitable type, including a stamp printer 54 for printing official stamps (e.g. visa or other passport stamp) on a security article. While reference is made herein to printing on the security article, it is understood that in some embodiments the printer 54 is operable to print a certificate of authenticity or other issued document, sticker, label or the like that is separate from the security article.

The printer 54 of the first embodiment includes a printer slot 56 for receiving and ejecting the security article or other item. In variations, the dimensions of the printer slot 56 and the printer 54 will vary according to the dimensions of the item to be printed. In the first embodiment, the printer 54 is preferably a stamp printer 54 dimensioned for printing visa or other stamps on a standard-sized passport. In some embodiments, the printer 54 includes a second slot (not shown) separate from the printer slot 56 for ejecting the security article or other item.

In some embodiments, the printer 54 includes a removable access plate 58 for providing access to the printer 54 mechanism, such as may be desirable in the case of a printer jam for example.

According to a preferred embodiment of the invention the access to the printer 54 mechanism and in particular to security ink is secured by biometric data of the operator, encrypted key or any mechanical or electronic keys or sensors. In one example the removable access plate 58 can only be moved in case an operator having the according rights was verified by biometric data.

Figure 3:
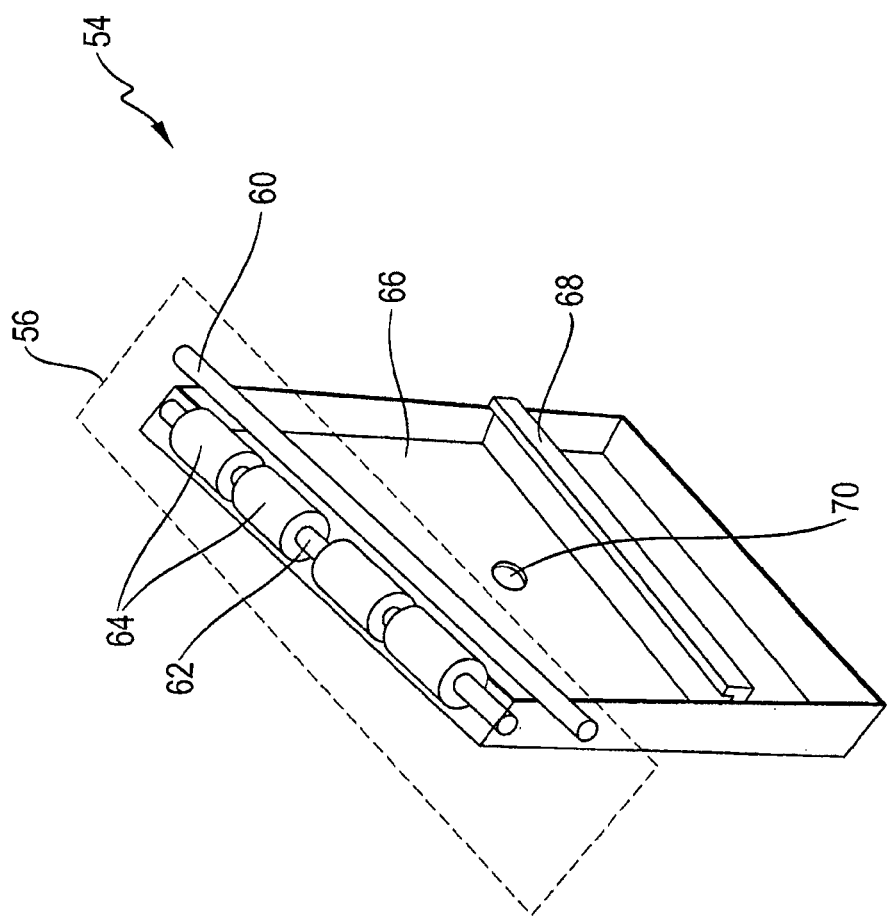
FIG. 3 is a perspective of a printer mechanism of a printer of the portable apparatus shown in FIG. 1.

Referring to FIG. 3, the printer 54 in the first embodiment includes, below the printer slot 56, a roller 60 and a feeding roller 62 between which the security article is received and ejected. Typically, the roller 60 is made of stainless steel or similar and the feeding roller 62 includes rubberized or otherwise gripping roller members 64 for contacting the security article. In the first embodiment, the printer 54 includes a vertically oriented (when the portable case 12 is in its typical operational orientation shown in FIGS. 1 and 2) printing tray 66 dimensioned according to the expected dimensions of the security article or other item to be printed. In some embodiments, the printer 54 includes a push-plate 68 to assist in moving the security article upwardly, such as during printing and/or ejection of the security article from the printer 54. In such embodiments, the printer 54 is operable to coordinate the rolling of the feeding roller 62 and the movement of the push-plate 68 to avoid inappropriate bending forces on the security article.

Still referring to FIG. 3, the printer 54 includes in some embodiments an imaging device such as a camera 70 for imaging an item while the item is inserted inside the printer 54, such as before printing to facilitate a determination of a suitable location or area on the item where printing should occur (e.g. an unprinted area for printing a passport stamp) and/or after printing to facilitate a determination of printing quality, e.g. for quality control purposes. Features related to printing that are disclosed in WO 2014180840 are incorporated herein by reference. For example, in some embodiments, the printer 54 is operable to receive user input indicating a location or area of the item inserted into the printer 54 upon which printing should occur, and to print at the indicated location or area.

Referring back to FIGS. 1 and 2, the apparatus 10 in the first embodiment includes an information processing unit such as the control panel 72. In the first embodiment, the control panel 72 includes a touch-screen display. The display of the control panel 72 may be of any suitable form, including a liquid-crystal display (LCD), light emitting diode display (LED displays), organic light emitting diode display (OLEO display), vacuum fluorescent display (VFO), and the like. In some embodiments, the control panel 72 includes a keyboard or other set of buttons for receiving user input. The control panel 72 is operable to provide status information regarding apparatus 10 operations, including operations of apparatus 10 devices such as authentication devices; prompt the operator for user input; receive user input; and perform control operations in respect of the apparatus 10 and its devices including the apparatus 10 authentication devices.

The control panel 72 in the first embodiment includes a processing circuit and a memory circuit (not directly visible in the Figures). The processing circuit may be or include a central processing unit (CPU) or any suitable electronic circuitry for information processing. The memory circuit may be or include any suitable digital storage medium, and typically stores program data and/or measurement data, including storing program code for directing operations of the control panel 72 and, more generally, the apparatus 10.

In some embodiments, the apparatus 10 includes an information processing unit in the form of a portable computing device such as a laptop computer, notebook computer, tablet computer, personal digital assistant (PDA), etc. As shown in FIGS. 1 and 2, the apparatus 10 of the first embodiment includes both the control panel 72 and the notebook computer 74. In variations, the various apparatus 10 control and user interface functions may be performed by the control panel 72, the notebook computer 74, or both the control panel 72 and the notebook computer 74. For example, in some embodiments either or both of the control panel 72 and the notebook computer 74 may be operable to receive images from the printer 54; prompt the operator for an indication of a location or area where printing should occur; receive as user input the indication of the location or area; send a command to the printer 54 indicating the location or area; and perform an automated evaluation of printing quality on the basis of image(s) received from the printer 54.

According to another preferred embodiment the imaging device 20 and many other parts and components can be part of/be integrated in the notebook.

The apparatus 10 in the first embodiment includes a communications module 76 (not directly visible in the Figures) for communicating with a remote server (not shown) that is typically distal from the apparatus 10. In variations, the communications module 76 may be part of the notebook computer 74, part of the control panel 72, separate from both the notebook computer 74 and the control panel 72, or any combination thereof for example. The communications module 76 is preferably operable to provide secure communications between the apparatus 10 and the remote server. The apparatus 10 is in the first embodiment operable to cause the communications module 76 to transmit data generated at the apparatus 10 to the remote server. In variations, the apparatus 10 may be operable to transmit such data immediately upon being generated at the apparatus 10, in subsequent batch transmissions, or any combination thereof. In the first embodiment, the apparatus 10 is operable to delete data that has been transmitted to the remote server. The communications module 76 may be operable to conduct communications via any suitable wireless communications means, including satellite, cellular, radio, other communications links, and any combination thereof. Features related to information processing and communications that are disclosed in WO 2014180840 are incorporated herein by reference.

In some embodiments, at least some of the apparatus 10 features and/or devices are operable to be controlled remotely by the remote server. Additionally or alternatively, the apparatus 10 is operable in some embodiments to transmit data being generated by the apparatus 10, including its authentication devices, to the remote server for remote storage. In some embodiments, the apparatus 10 is operable to delete from its own memory data that has been transmitted to the remote server.

In some embodiments, information associated with particular individual(s) who are permitted to operate the apparatus 10 may be stored in the apparatus 10 and/or in the remote server. Each such individual may be referred to as a registered operator of the apparatus 10. Different individuals may be registered to operate different apparatus 10 units, for example.

In some embodiments, the apparatus 10 is operable to determine the proximity (i.e. distance) of the registered operator to the apparatus 10. For example, the apparatus 10 in some embodiments includes a proximity sensor 78 which includes a wireless transceiver (not directly visible in FIGS. 1 and 2) that is operable to communicate with a corresponding transceiver (e.g. pager unit, RFID tag, or similar) that is intended to be worn by the registered operator. However, the radiant energy produced by the wireless transceiver is preferably adjusted such that communications is established only when the proximity sensor 78 and its corresponding transceiver are within a specifiable distance.

In some embodiments, the apparatus 10 is operable to determine its location, such as by having a location identification module which may be any of satellite based (GPS, GLONASS, GALILEO, etc.) and/or cellular network based (GSM, 3GPP, UMTS, GPRS, LTE, etc.). In such embodiments, the apparatus 10 is typically operable to communicate its location to the remote server, including communicating its location by encrypted communications. Thus, in some embodiments each of the apparatus 10 and a location identification device present with the registered operator are operable to determine their respective location; and the apparatus 10 is operable to determine or receive (e.g. from the remote server) a calculation of proximity based on the GPS (or similar) readings.

In the first embodiment, the apparatus 10 is operable to transmit data and other measured information to the remote server, including transmitting video and audio data. For example, the imaging device set 20 may be operable to capture images at a desired rate, which could be anywhere from one image every few minutes, to a full video rate equal to or in excess of 60 frames/second. In the first embodiment, the apparatus 10 is operable to transmit the captured images and audio to the remote server as separate data streams and/or as synchronized data streams for example.

Still referring to FIGS. 1 and 2, the apparatus 10 in the first embodiment may include a mobile phone holder. Typically, the mobile phone of the operator of the apparatus 10 is held by the mobile phone holder. In some embodiments, the apparatus 10 includes a mobile phone docking and charging station (not shown). In some embodiments, the mobile phone holder is adjustable to accommodate mobile phones of varying sizes. In some embodiments, the mobile phone holder is replaceable with mobile phone holders of different sizes to accommodate a variety of mobile phones and the like.

The apparatus 10 in the first embodiment includes a power pack battery source 82 (not directly visible in the Figures) containing at least one rechargeable battery for powering the apparatus 10 devices.

Referring to FIG. 2, the apparatus 10 in the first embodiment includes a power receptacle 84 for receiving AC power from an alternating current (AC) power source. The apparatus 10 in the first embodiment includes a battery charger 86 (not directly visible in the Figures) for charging the battery source 82 when receiving AC power via the power receptacle 84. In some embodiments, the apparatus 10 is operable to determine a charging status of the battery source 82. In such embodiments, the control panel 72, notebook computer 74, or both the control panel 72 and the notebook computer 74 are operable to display the charging status. Additionally or alternatively, in some embodiments the apparatus 10 includes an indicator separate from the control panel 72 and the notebook computer 74 for indicating the charging status. In some embodiments, one or both of the control panel 72 and the notebook computer 74 are operable to control operations of the battery charger 86.

In some embodiments, the apparatus 10 includes the external power receptacle 88 shown in FIG. 2. In such embodiments, the apparatus 10 is operable to receive electrical power for charging the power pack battery source 82 when the portable case 12 is in its closed position, including when locked closed. In such embodiments, the apparatus 10 may include an external charging status indicator 90 that is visible from outside of the portable case 12. In such embodiments, the apparatus 10 preferably includes a button switch 92 that must be pressed for the external charging status indicator 90 to temporarily display the charging status, thereby advantageously reducing the power consumed by the apparatus 10 to externally indicate the charging status.

The apparatus 10, including its various functions and devices, including authentication devices, may have multiple states such as wake and sleep modes for example. Sleep mode advantageously conserves power when a particular apparatus 10 feature or device is not in use. In some embodiments, all apparatus 10 features and devices are typically in sleep mode whenever the portable case 12 is in its closed position. However, in various embodiments the apparatus 10 is operable to perform certain functions while the apparatus 10 is in a sleep mode associated with the portable case 12 being in its closed position. For example, in the first embodiment the apparatus 10 is operable to detect that the portable case 12 is being altered from its closed position to its opened position while in the sleep mode associated with the closed position. In some embodiments, the apparatus 10 is operable to perform tamper detection while the portable case 12 is in its closed position. In some embodiments, the apparatus 10 is operable to communicate, including communicating by encrypted communications, its location while the apparatus 10 is in a sleep mode, including when the portable case 12 is in its closed position for example. Sleep and wake mode operations are performed provided sufficient electrical power is available to the apparatus 10 to perform such operations.

Figure 4:
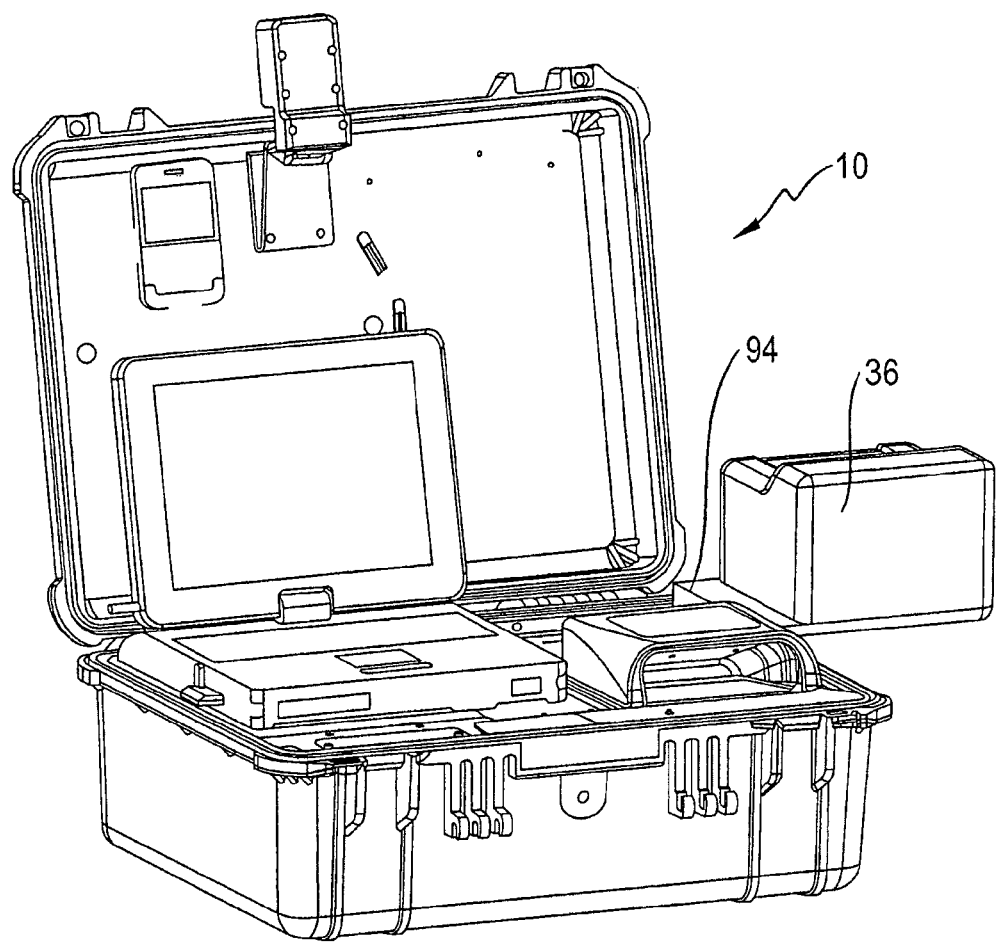
FIG. 4 is a perspective view of the portable apparatus shown in FIG. 1 according to a second embodiment of the invention.

Referring to FIG. 4, the apparatus 10 in accordance with a second and preferred embodiment is operable, when the portable case 12 is in its opened configuration, to permit the fingerprint reader 36 to extend outwardly from the portable case 12, thereby advantageously facilitating more convenient use of the fingerprint reader 36. In the second embodiment, the fingerprint reader 36 is rotatably attached to the portable case 12 via the fingerprint reader hinge 94. In the second embodiment, the fingerprint reader hinge 94 permits the fingerprint reader 36 to be rotated manually between a storage position, in which the fingerprint reader 36 is disposed entirely within the portable case, 12 and its operational position as shown in FIG. 4. In some embodiments, the fingerprint reader 36 is operable to automatically move into its operational position upon opening of the portable case 12. Additionally or alternatively, the apparatus 10 may be operable to cause the fingerprint reader 36 to automatically move into its operational position upon issuance of a command via one or both of the control panel 72 and the notebook computer 74. Wherever possible, descriptions of apparatus 10 features and methods or system herein referencing the first embodiment are construed as referring to either or both of the first and second embodiments.

Figure 5:
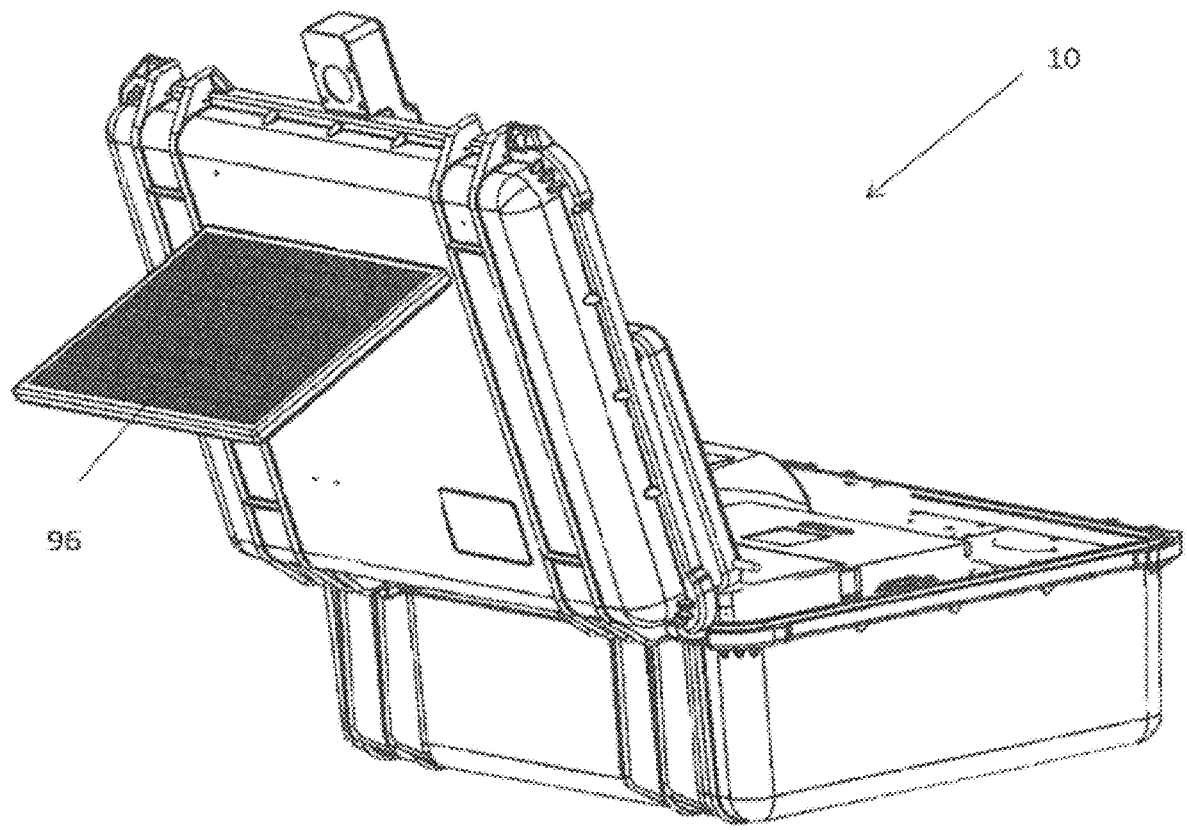
FIG. 5 is a perspective view of the portable apparatus shown in FIG. 1, showing a solar panel.

Referring to FIG. 5, the apparatus 10 in accordance with any embodiment, including either or both of the first and second embodiments, may include a renewal energy power source such as the solar panel 96 shown in FIG. 5. The solar panel 96 is preferably rotatable between a storage position (not shown), in which it is adjacent against the portable case 12 and minimally protruding from the portable case 12, and an operational position in which it is protruding from the portable case 12 at an angle. Preferably, the angle at which the solar panel 96 protrudes from the portable case 12 is adjustable, and in some embodiments is under electronic control.

Figure 6:
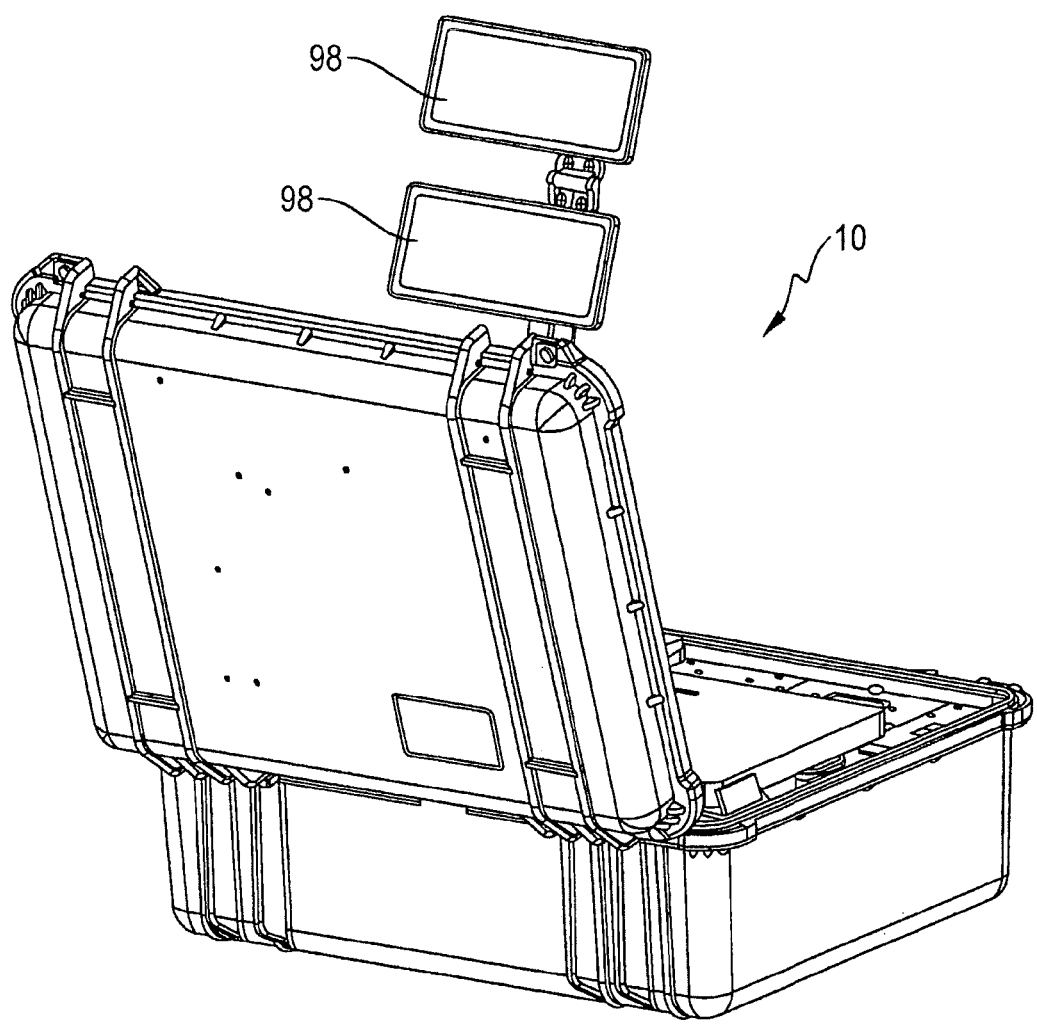
FIG. 6 is a perspective view of the portable apparatus shown in FIG. 1 or 2, showing an articulated solar panel.
Figure 7:
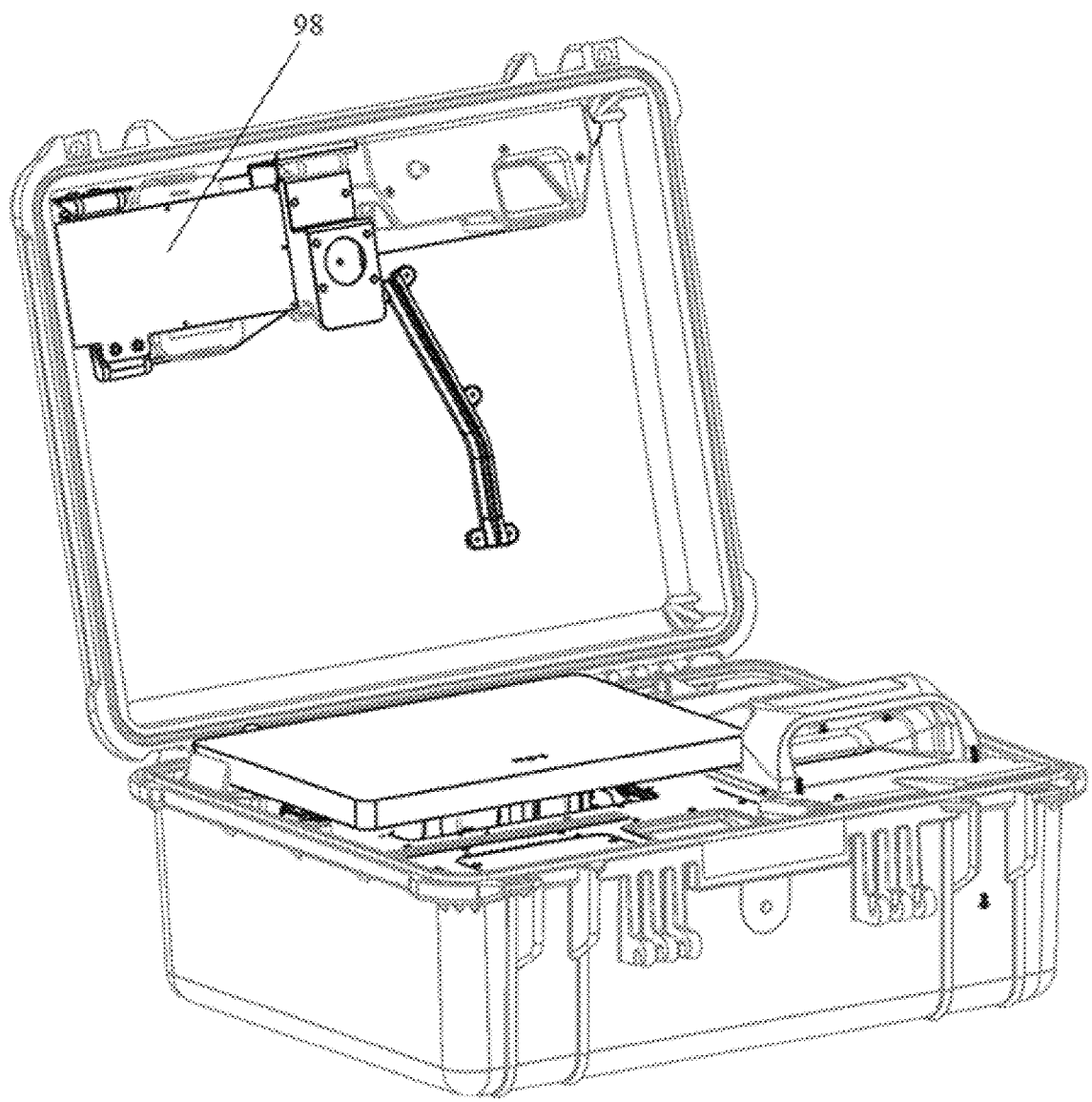
FIG. 7 is a perspective view of the articulated solar panel shown in FIG. 6, showing the articulated solar panel in a storage configuration.

Referring to FIGS. 6 and 7, the apparatus 10 in accordance with any embodiment, including either or both of the first and second embodiments, may include, in addition or in the alternative to the solar panel 96 (FIG. 5), one or more solar panels 98 that are connected to the portable case 12 at its interior. For example, FIGS. 6 and 7 shown two solar panels 98 that are articulatably connected to the portable case 12 at its interior, thereby advantageously providing a storage position (FIG. 7) for the solar panels that is protected by the portable case 12 during storage when the portable case 12 is in its closed (e.g. locked) position.

Figure 8:
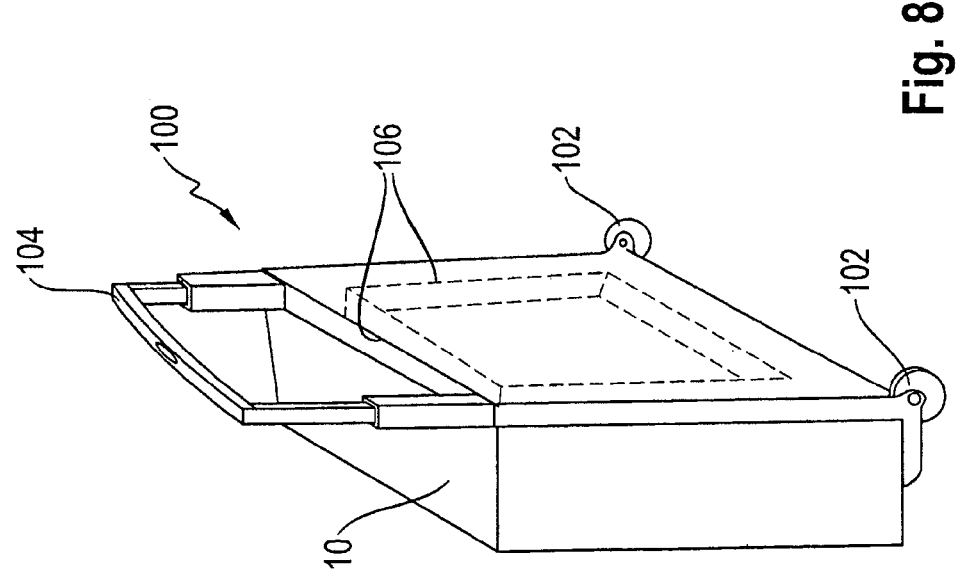
FIG. 8 is a perspective view of the portable apparatus shown in FIG. 1 or 2, showing a portability accessory.

Referring to FIG. 8, the apparatus 10 in accordance with any embodiment, including either or both of the first and second embodiments, may include a portability accessory 100 having a pair of wheels 102 and a handle 104. In some embodiments, the portability accessory 100 is removably attachable to the portable case 12. In some embodiments, the handle 104 is telescoping. In some embodiments, the portability accessory includes a compartment 106 generally extending along the outer side of the portable case 12. In the embodiment shown in FIG. 8, the compartment 106 has a length commensurate with the distance between the wheels 102, a height commensurate with the height of the apparatus 10, and a width commensurate with the width of the wheels 102 and/or the handle 104. Other dimensions are possible. In some embodiments, the compartment 106 is dimensioned for containing one or more backup batteries for use in conjunction with or in replacement of the battery source 82. In variations, the backup batteries may be in the form of clip-on type batteries, cable-connected batteries, externally connected batteries, other battery types, and any combination thereof. In embodiments for use with externally connected batteries, the apparatus 10 includes an electrical connection, which may be an industrial or military grade connection, extending through a wall of the portable case 12. In some embodiments, such electrical connection is a watertight and/or airtight connection.

Figure 9:
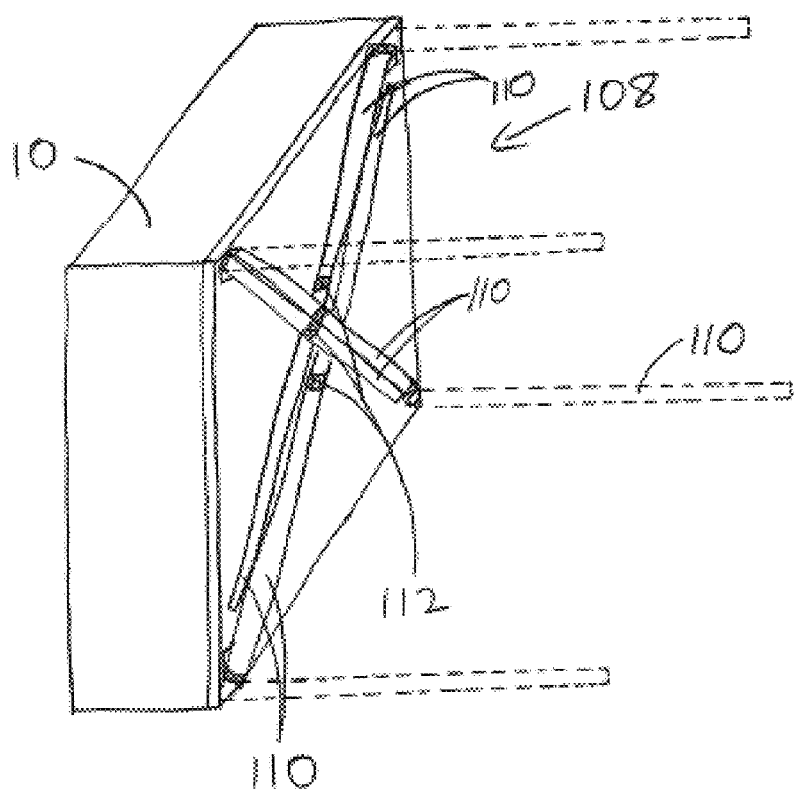
FIG. 9 is a perspective view of the portable apparatus shown in FIG. 1 or 2, showing an operation-position accessory.

Referring to FIG. 9, the apparatus 10 in accordance with any embodiment, including either or both of the first and second embodiments, may include an operation-position accessory 108 having a plurality of folding legs 110. For example, the operation-position accessory 108 may include four folding legs 110 each of which are rotatable into an operational position (shown by dotted line) in the manner of a portable table. In some embodiments, the legs 110 are telescoping or otherwise length-adjustable to permit height adjustment of the portable case 12 when set up in the operational position. For example, the legs 110 may include leg clamps 112 for clamping each leg 110 at an adjustable length. In some embodiments, the operation-position accessory 108 is removably attachable to the portable case 12.

Referring to FIGS. 8 and 9, the portability accessory 100 and the operation-position accessory 108 are preferably dimensioned to permit simultaneous removable attachment of both the portability accessory 100 and the operation-position accessory 108, thereby advantageously permitting use of either, neither, or both of the accessories 100 and 108 in respect of any given apparatus 10.

While certain devices are described herein above as being accommodated within the portable case 12, in general the portable case 12 may accommodate any equipment selected from the group consisting of cameras, audio recorders, proximity detectors, thermal detectors, tactile sensors, vibration sensors, magnetic energy detectors, ultrasound detectors, ultrasonic transducers, ultrasonic transceivers, motion detectors, document scanners, printers, stamping equipment, speakers, microphones, displays, biographic information capturing devices, biometric data capturing devices, output devices, security article receiving devices, security article supports, processors, communication devices, (uninterrupted) power supply equipment, batteries, heating systems, cooling systems, and combinations thereof.

The apparatus 10 in some embodiments includes a heating system to facilitate operation of apparatus 10 devices or other equipment accommodated within the portable case 12 in outdoor, cold environments (e.g. tundra). Additionally or alternatively, the apparatus 10 in some embodiments includes a cooling system to facilitate operation of apparatus 10 devices or other equipment accommodated within the portable case 12 in outdoor, hot environments (e.g. desert). Typically, the cooling system includes a compressor and condenser in the manner of a known refrigeration unit or similar. In variations, heating and/or cooling systems of varying capabilities may be employed.

The apparatus 10 in accordance with any embodiment, including either or both of the first and second embodiments, may include a temperature control accessory that is externally mounted to the outside of the portable case 12. In variations, the temperature control accessory may include a heating system, a cooling system, or both a heating system and a cooling system. In the case of including at least a cooling system, the temperature control accessory is preferably mounted by sealed attachment to the outside of the portable case 12 to preserve compliance with industrial and/or military standards for watertightness and other qualities, while still permitting the passage of a cooled fluid such as air through an aperture (not shown) in the portable case 12. Preferably, such aperture is surrounded by the sealed attachment of the externally mounted temperature control system. In embodiments having the externally mounted temperature control accessory, the portability accessory 100 (FIG. 8) and/or the operation-position accessory 108 (FIG. 9) can be removably attached to the outside of the combined portable case 12 and temperature control accessory.

Thus, there is provided a portable apparatus for authenticating a security article, the apparatus comprising: (a) an authentication device operable to authenticate the security article; and (b) a first plurality of imaging devices for simultaneously imaging in opposing directions, wherein the first plurality of imaging devices are portably coupled to the authentication device.

Method of Operation

Figure 10:
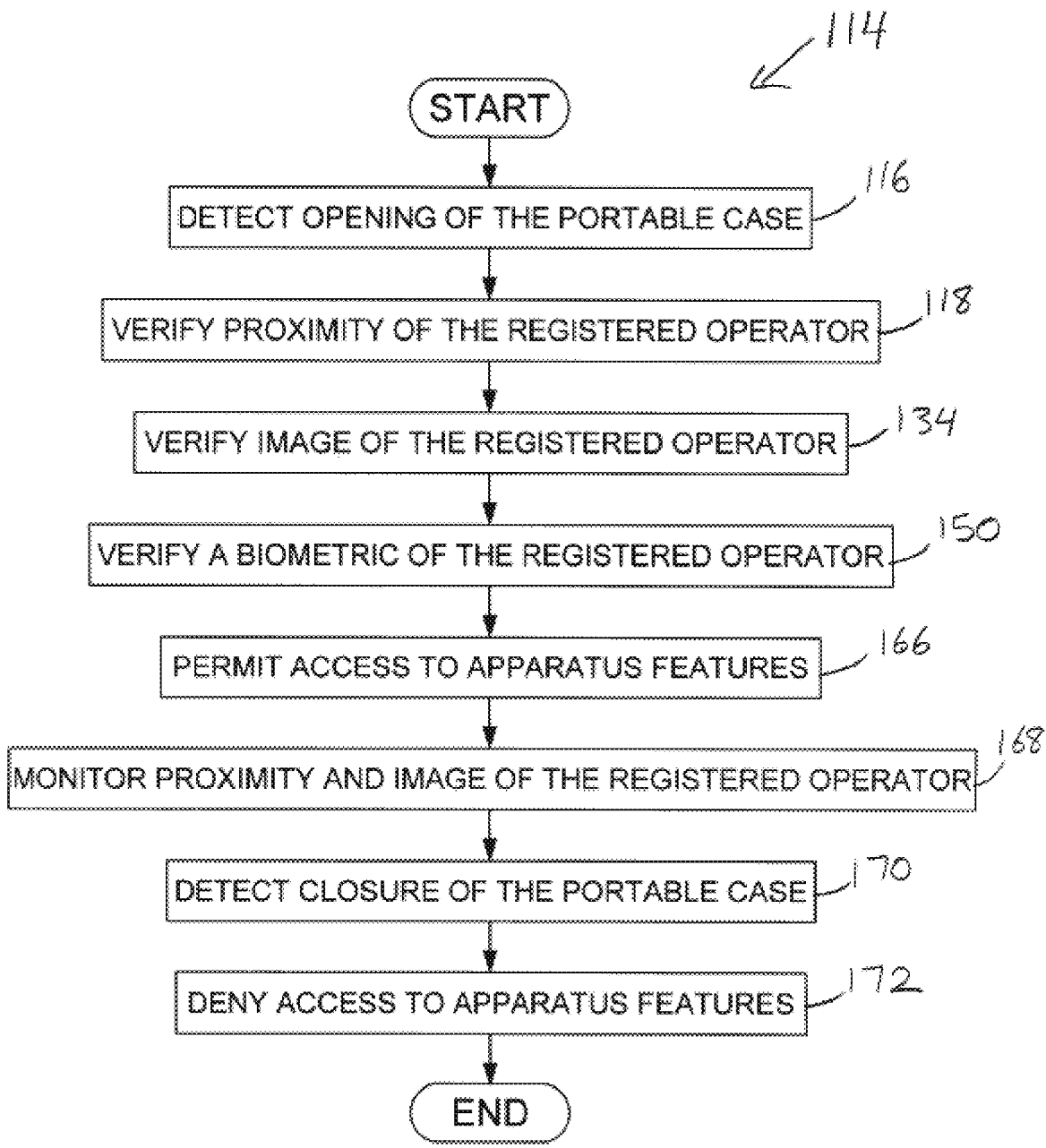
FIG. 10 is a flow diagram of a method of operating a portable authentication apparatus in accordance with the first or second embodiment of the invention.

Referring to FIG. 10, the memory circuit of the control panel 72 and/or notebook computer 74, or other electronic storage medium of the apparatus 10 in accordance with any embodiment, including either or both of the first and second embodiments, contains blocks of code comprising computer executable instructions for directing the processing circuit, such as a CPU of the apparatus 10, to perform the steps of a method shown generally at 114. Additionally or alternatively, such blocks of code may form part of a computer program product comprising computer executable instructions embodied in a signal bearing medium, which may be a recordable computer readable medium or a signal transmission type medium, for example. The processing circuit being directed by such blocks of code may be referred to as the processor of the apparatus 10.

As described herein above, the apparatus 10 features and devices are generally in a sleep mode when the portable case 12 is in its closed position. The description herein below of the method of operation of the apparatus 10 is based on the scenario where there is one individual who is a registered operator of the apparatus 10, the portable case 12 is initially in its closed position, and the apparatus 10 is initially in a sleep mode. Other variations may be apparent to the person of ordinary skill in the art, and the description herein is not intended to be limiting of the capabilities of the apparatus 10.

When electrical power is being supplied to the processor of the apparatus 10, the processor is directed to begin executing the instructions of block 116. Block 116, when the portable case 12 is in its closed position and the apparatus 10 is in its sleep mode, directs the processor to detect the opening of the portable case 12 whenever it may next occur.

When the processor by block 116 detects the portable case 12 being opened, block 118 then directs the processor to verify the proximity of the registered operator of the apparatus 10.

Figure 11:
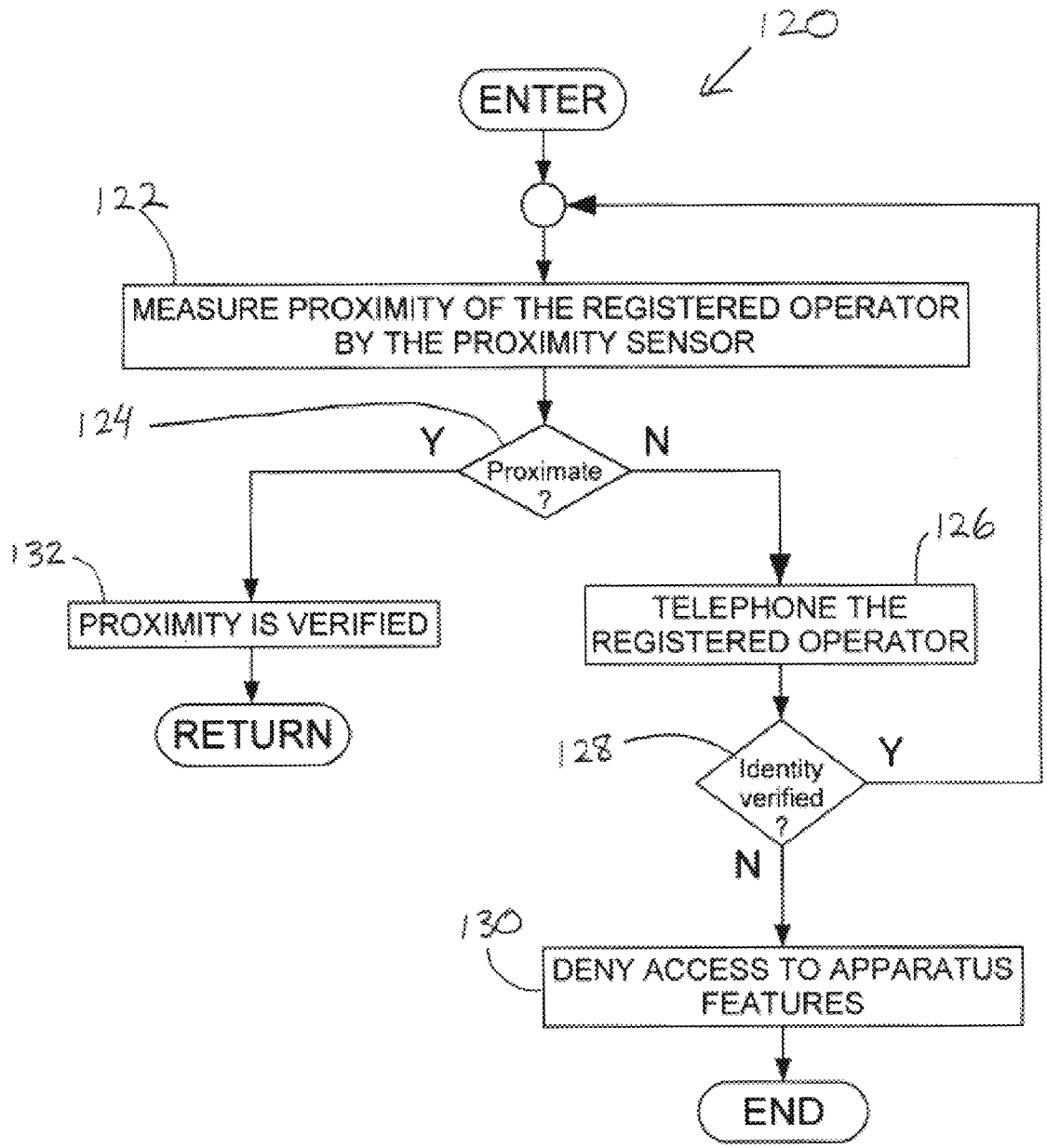
FIG. 11 is a flow diagram of a part of the method shown in FIG. 10, showing a step of measuring proximity of a registered operator of the portable authentication apparatus by a proximity sensor of the portable authentication apparatus.

Referring to FIG. 11, an exemplary method for directing the processor to perform steps of block 118 (FIG. 10) is shown generally at 120. Method 120 begins execution at block 122, which directs the processor to measure the proximity of the registered operator by using the proximity sensor 78. Block 124 directs the processor to determine whether the proximity sensor 78 is indicating that the registered operator is proximate to the apparatus 10. Typically, the processor receives an indication from the proximity sensor 78 as to whether the registered operator's corresponding transceiver is proximate to the proximity transceiver of the apparatus 10. In some embodiments, a first location of the apparatus 10 is determined, a second location of the registered operator is determined, a distance between the first and second locations is calculated, and the calculated distance is compared to a previously stored proximity threshold. In some embodiments, the processor is operable to determine that the registered operator is not proximate to the apparatus 10 after a sufficient amount of time has elapsed during which no indication has been received from the proximity sensor 78.

If by block 124 the processor determines that the registered operator is not in proximity to the apparatus 10, then block 126 directs the processor to initiate a telephone call to a telephone, such as a mobile phone, of the registered operator. The telephone of the registered operator may be of any suitable type, including a satellite phone, cellular phone, 2-way radio, VoIP phone, and the like. In at least the first and second embodiments, the processor causes the telephone call to be initiated by transmitting to the remote server an indication that the proximity of the registered operator is not verified. At the remote server, either an automated system or a human caller may place the telephone call to the telephone of the registered operator using a previously stored telephone number associated with the registration of the registered operator. The telephone system employed for the automated telephone dialing features may be a standard voice communications network, for example. In the case of an automated telephone call, an automated dialer and interactive voice response (IVR) unit may be employed for example. In the case of an IVR, the IVR may prompt the person answering the telephone call to enter a code via the telephone keypad to confirm the identity of the registered operator. In the case of a human caller, the human caller may interact by voice during the telephone call to confirm the identity of the person receiving the telephone call. In either case, if the registered operator answers the call and properly confirms their identity, the registered operator is requested to locate themselves in proximity to the apparatus 10 and to turn on their corresponding proximity transceiver and/or location identification device, if not already done so. If the telephone call is placed remotely, the remote server typically communicates the result of the telephone call to the processor of the apparatus 10.

While block 126 is described herein above in relation to a telephone call to a telephone, any suitable personal communications technique involving any associated communications technology and/or device may be employed. By way of non-limiting example, text messages (e.g. SMS) may be employed in place of a voice call.

When block 126 has been executed, block 128 then directs the apparatus 10 processor to determine whether the identity of the registered operator was verified by the telephone call.

If by block 128 the processor determines that the identity of the registered operator was verified by the telephone call, then the processor is directed to return to block 122 to re-measure the proximity of the registered operator by the proximity sensor 78, in the manner previously described herein above.

If by block 128 the processor determines that the identity of the registered operator was not verified by the telephone call, then block 130 directs the processor to deny access to apparatus 10 features and/or devices such as the authentication devices. In variations, denying access to apparatus 10 features and/or devices may involve any one or more of: putting the apparatus 10 processor into sleep mode; putting one or more authentication devices into sleep mode; transmitting all data currently stored in the apparatus 10 to the remote server; deleting all data currently stored in the apparatus 10; and self-destructing hardware and/or firmware component(s), such as an electronic memory storage medium, by the application of excessively high voltage power, electromagnetic radiation such as UV radiation, other related self-destruction techniques, or any combination thereof for example.

While for ease of illustration method 120 shows an unending (i.e. infinite) loop in the case where the processor determines by block 124 that the registered operator is not within proximity to the apparatus 10 and yet determines by block 128 that the identity of the registered operator is verified, typically the processor will proceed to block 130 upon determining that the registered operator is not in sufficient proximity a specific limited number of times.

In some embodiments, blocks 126 and 128 are omitted and the method proceeds directly to block 130 if the processor determines by block 124 that the registered operator is not proximate to the apparatus 10.

After block 130 has been executed, the processor is directed to end the method 114 (FIG. 10). Ending the method 114 may involve setting the apparatus 10 or selected apparatus 10 features and/or devices to a sleep mode, for example.

If by block 124 the processor determines that the registered operator is in proximity to the apparatus 10, then block 132 is executed. Typically, block 132 directs the processor to store in memory an indication, such as a register flag, indicating that proximity is verified. The process then returns to the method 114 after block 118 of FIG. 10.

Referring back to FIG. 10, block 134 directs the processor to verify the image of the registered operator of the apparatus 10.

Figure 12:
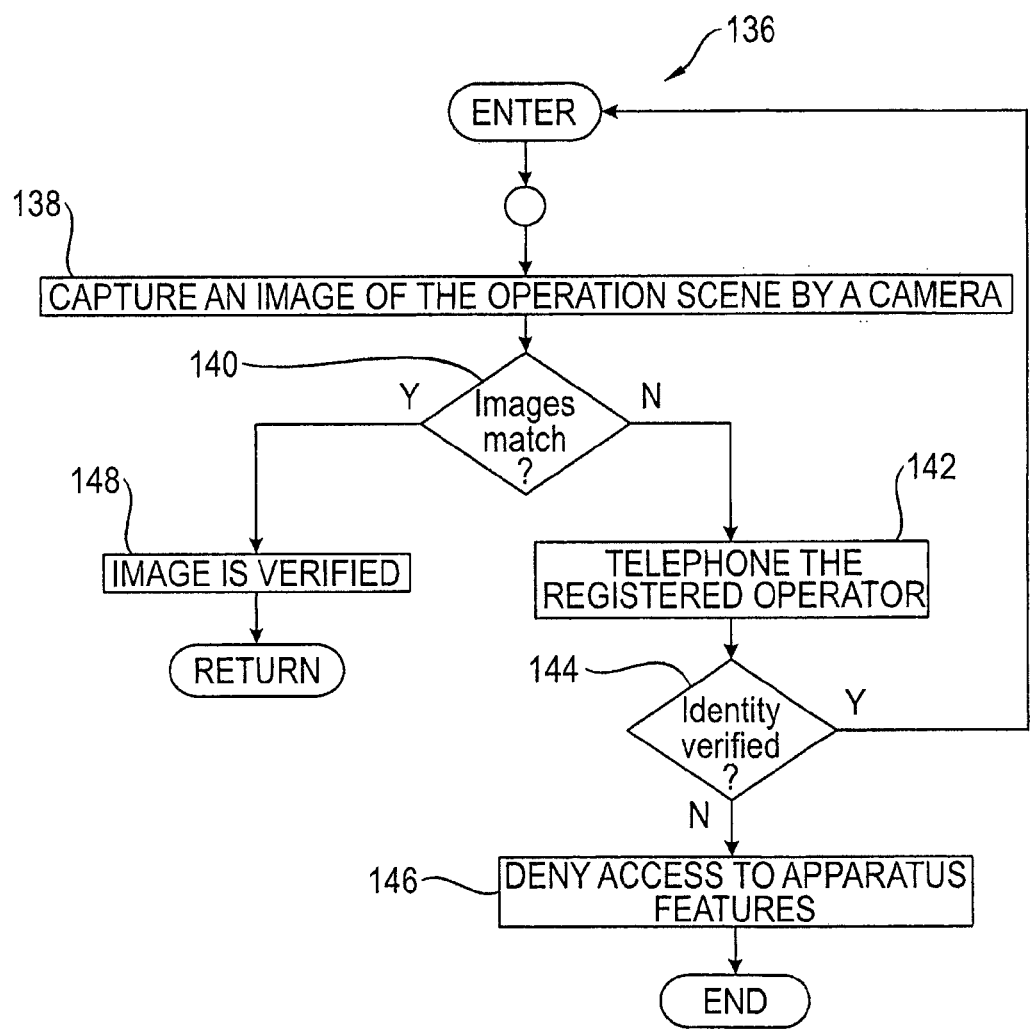
FIG. 12 is a flow diagram of a part of the method shown in FIG. 10, showing a step of capturing an image of an operation scene by a camera of the portable authentication apparatus.

Referring to FIG. 12, an exemplary method for directing the processor to perform steps of block 134 (FIG. 10) is shown generally at 136. Method 136 begins execution at block 138, which directs the processor to cause a camera of the apparatus 10, such as one or more of the cameras 24 to 34 of the imaging device set 20, to capture an image of the operation scene. Typically, the operation scene includes the area where an operator of the apparatus 10 would ordinarily place themselves in front of the apparatus 10 and facing the control panel 72 and/or the notebook 74.

Block 140 then directs the processor to determine whether a previously stored image of the registered operator, such as an image stored at the remote server that had previously been acquired during registration of the registered operator, matches an image captured by executing block 138. Typically, image processing is performed, such as image processing performed at the remote server, for facial recognition of human faces in the image(s) captured by executing block 138. Upon recognition of a human face, human facial characteristics derived from the captured image are compared to previously stored facial characteristics associated with the registered operator. Such comparison may be performed at the remote server or by the apparatus 10, for example. The results of the comparison are either determined or received by the apparatus 10 processor. Thus, the apparatus 10 processor is operable to determine whether a previously stored image of the registered operator matches an image captured by executing block 138.

If by block 140 the processor determines that the compared images do not match, then the processor is directed to execute block 142 shown in FIG. 12. In at least the first and second embodiments, block 142 is identical to block 126 (FIG. 11). After executing block 142, block 144 then directs the processor to determine whether the identity of the registered operator was verified by the telephone call of block 142.

If by block 144 the processor determines that the identity of the registered operator was verified by the telephone call, then the processor is directed to return to block 138 to re-capture further images of the operation scene, in the manner previously described herein above.

If by block 144 the processor determines that the identity of the registered operator was not verified by the telephone call, then the processor is directed to execute block 146. In at least the first and second embodiments, block 146 is identical to block 130 (FIG. 11).

While method 136 shows an unending (i.e. infinite) loop in the case where the processor determines by block 140 that the stored and captured images do not match and yet determines by block 144 that the identity of the registered operator is verified, typically the processor will proceed to block 146 upon failing to match the stored and captured images a specific limited number of times.

In some embodiments, blocks 142 and 144 are omitted and the method proceeds directly to block 146 if the processor determines by block 140 that the stored and captured images do not match.

After block 146 has been executed, the processor is directed to end the method 114 (FIG. 10). Ending the method 114 may involve setting the apparatus 10 or selected apparatus 10 features and/or devices to a sleep mode, for example.

If by block 140 the processor determines that stored images associated with the registered operator and images captured by executing block 138 do match, then block 148 is executed. Typically, block 148 directs the processor to store in memory an indication, such as a register flag, indicating that the image of the registered operator is verified. The process then returns to the method 114 after block 134 of FIG. 10.

Referring back to FIG. 10, block 150 directs the processor to verify a biometric of the registered operator of the apparatus 10. Typically, the biometric to be verified is in addition to any biometric information that was or could be obtained from a camera-captured image of the registered operator.

Figure 13:
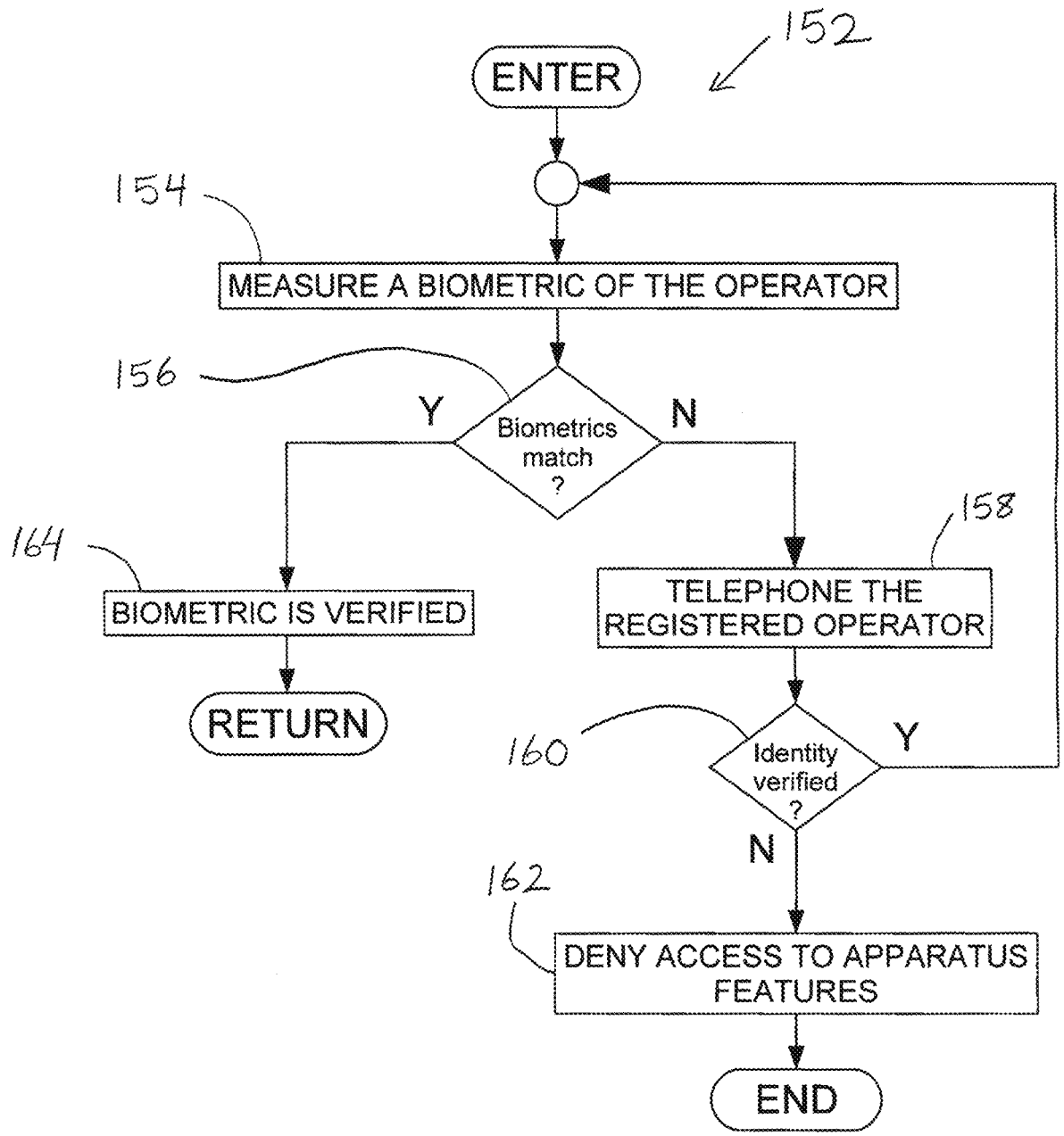
FIG. 13 is a flow diagram of a part of the method shown in FIG. 10, showing a step of measuring a biometric of an operator of the portable authentication apparatus.

Referring to FIG. 13, an exemplary method for directing the processor to perform steps of block 150 (FIG. 10) is shown generally at 152. Method 152 begins execution at block 154, which directs the processor to measure a biometric of the registered operator. In at least the first and second embodiments, the processor is directed by block 154 to prompt the apparatus 10 operator to place their finger(s) and/or palm on the fingerprint reader window 38 of the fingerprint reader 36 (FIGS. 1 and 2); to scan the fingerprint(s) of the individual who does so; and to store in memory the scanned fingerprint(s). The apparatus 10 in some embodiments is also operable to capture images of the individual placing their finger(s) and/or palm on the fingerprint reader 36 and to transmit such images to the remote server for further verification. In some embodiments, executing block 154 involves transmitting the scanned fingerprint(s) to the remote server.

Block 156 directs the processor to determine whether previously stored biometric data (e.g. scanned fingerprint) of the registered operator, such as biometric data stored at the remote server that had previously been acquired during registration of the registered operator, matches the biometric measured by block 154. Any suitable comparison technique may be employed by the apparatus 10 and/or at the remote server such that the apparatus 10 processor is operable to determine or receive a determination indicating whether a previously stored biometric of the registered operator matches a biometric obtained by executing block 154.

If by block 156 the processor determines that the compared biometrics do not match, then the processor is directed to execute block 158 shown in FIG. 13. In at least the first and second embodiments, block 158 is identical to block 126 (FIG. 11) and block 142 (FIG. 12). After executing block 158, block 160 then directs the processor to determine whether the identity of the registered operator was verified by the telephone call of block 158.

If by block 160 the processor determines that the identity of the registered operator was verified by the telephone call, then the processor is directed to return to block 154 to re-measure the biometric of the registered operator, in the manner previously described herein above.

If by block 160 the processor determines that the identity of the registered operator was not verified by the telephone call, then the processor is directed to execute block 162. In at least the first and second embodiments, block 162 is identical to block 130 (FIG. 11) and block 146 (FIG. 12).

While method 152 shows an unending (i.e. infinite) loop in the case where the processor determines by block 156 that the stored and measured biometrics do not match and yet determines by block 160 that the identity of the registered operator is verified, typically the processor will proceed to block 162 upon failing to match the stored and measured biometrics a specific limited number of times.

In some embodiments, blocks 158 and 160 are omitted and the method proceeds directly to block 162 if the processor determines by block 156 that the stored and measured biometrics do not match.

After block 162 has been executed, the processor is directed to end the method 114 (FIG. 10). Ending the method 114 may involve setting the apparatus 10 or selected apparatus 10 features and/or devices to a sleep mode, for example.

If by block 156 the processor determines that stored biometric associated with the registered operator and the biometrics measured by executing block 154 do match, then block 164 is executed. Typically, block 164 directs the processor to store in memory an indication, such as a register flag, indicating that the biometric of the registered operator is verified. The process then returns to the method 114 after block 150 of FIG. 10.

Referring back to FIG. 10, block 166 directs the processor to permit access to apparatus 10 features. In at least the first and second embodiments, permitting access apparatus 10 features involves permitting use of the passport reader 42 and the printer 54, such as by causing at least the passport reader 42 and the printer 54 from their sleep modes to their wake modes, respectively.

Block 168 then directs the apparatus 10 processor to monitor the proximity and image of the registered operator. In at least the first and second embodiments, the apparatus 10 processor is operable to perform periodic or continuous monitoring of an output signal of the proximity sensor 78. If at any time the proximity sensor 78 indicates that the registered operator is not in proximity to the apparatus 10 or the image of the registered operator cannot be captured by an apparatus 10 camera, the apparatus 10 is operable to return, including immediately returning, the authentication devices, especially the passport reader 42 and the printer 54, to their respective sleep modes. In some embodiments, the processor will cause a telephone call to the registered operator's mobile phone prior to returning the authentication devices to their respective sleep modes. In some embodiments, a failure to maintain an indication of the presence of the registered operator and/or telephone contact with the registered operator will result in data currently stored in the apparatus 10 memory to be transmitted to the remote server and/or deleted from the apparatus 10 memory. In some embodiments, a failure to maintain an indication of the presence of the registered operator and/or telephone contact with the registered operator, absent an orderly shutdown of the apparatus 10 features, will result in automated self-destruction of selected hardware and/or firmware component(s) of the apparatus 10.

In some embodiments, the apparatus 10 processor is directed to maintain periodic or continuous communications, which may be encrypted communications, with the remote server. In such embodiments, the processor may be directed to cause deletion of currently stored data if communications between the apparatus 10 and the remote server is lost. Additionally or alternatively, the processor in some embodiments is directed to cause self-destruction of hardware and/or firmware of the apparatus 10 upon losing communications between the apparatus 10 and the remote server.

Block 170 directs the processor to detect, at any time, the closure of the portable case 12. In at least the first and second embodiments, the sensor 14 (FIGS. 1 and 2) output is connected to the processor such that the processor is operable to monitor or otherwise receive an output signal of the sensor 14 indicative of the closure of the portable case 12.

Upon detection of the closure of the portable case 12, block 172 directs the processor to deny access to apparatus 10 features. The descriptions of block 130 (FIG. 11), block 146 (FIG. 12) and block 162 (FIG. 13) herein above are applicable to block 172 of FIG. 10.

Still referring to FIG. 10, when block 172 has been executed the processor is directed to end the method 114.

For ease of description, the method 114 is described herein above as having a particular order in which the various steps of method 114 are performed. However, in variations the steps of method 114 may be performed in a variety of orders, including simultaneously such as by multi-tasking processors. For example, blocks 118, 134 and 150 may be executed in a different order than that shown in FIG. 10. In some embodiments, the image of the registered operator is attempted to be verified prior to attempting to verify the proximity of the registered operator, for example. In variations, one or more of blocks 118, 134 and 150 may be omitted. Additionally or alternatively, the apparatus 10 may be operable to record audio data by the microphone 40 as an authentication device; perform voice recognition at the apparatus 10 or cause voice recognition algorithms to be performed at the remote server; perform a comparison at the apparatus 10 or cause a comparison to be performed at the remote server between a stored voice signature associated with the registered operator and the audio data recorded at the apparatus 10 or voice recognition result thereof; and verify the registered operator by such audio means for example. While FIG. 10 shows blocks 170 and 172 being executed after blocks 166 and 168, in general blocks 170 and 172 may be performed at any time, including in response to an asynchronous detection of the closure of the portable case 12 for example. In some embodiments, the apparatus 10 and/or the system formed by the apparatus 10 and the remote server is operable to execute in parallel the methods and steps described herein.

Thus, there is provided a method of operating a portable authentication apparatus, the method comprising: (a) determining whether a registered operator of the portable authentication apparatus is verified; and (b) permitting access to an authentication device of the portable authentication apparatus if the registered operator is verified.

Further Features and Embodiments

According to further embodiments, the security feature described herein is a pattern representing a code selected from the group consisting of special characters, series of alphanumerical characters and combinations thereof. Alternatively, the security feature described herein is a 1-dimensional barcode, a stacked 1-dimensional barcode, a 2-dimensional barcode (such as a DataMatrix or a QR-Code) or a 3-dimensional barcode. Such a code may comprise additional or redundant information in an encoded form so that it is generally not readable or understandable without a key or a procedure to decode the encoded information. When the security feature described herein is a pattern representing a code, said pattern is preferably invisible to the naked eye.

In some embodiments, the physical property of the security feature described herein consists of an optical property. Optical properties of the security feature described herein refers to any spectrally selective return of light (electromagnetic radiation) at a predetermined color (predetermined wavelength) from an illuminated object, be it in the visible (400 to 700 nm), the infrared (700 to 10,000 nm, and preferably 700 to 2500 nm) or in the UV range (less than 400 nm) of the electromagnetic spectrum (i.e. in the whole wavelength range preferably from 200 nm to 2500 nm). The optical property is preferably selected from the group consisting of intensities of reflected light, reflection wavelengths, optically variable properties, intensities of IR absorbed light, IR absorption wavelengths, intensities of emitted light, emission wavelengths, light polarizations and combinations thereof. Further, optical properties of the security feature described herein may be preferably selected from the group consisting of optically variable characteristics, IR absorption characteristics, emission characteristics, light polarization characteristics and combinations thereof.

Optically variable elements are known in the field of security printing. Optically variable elements (also referred in the art as goniochromatic elements or color-shifting elements) exhibit a viewing-angle or incidence-angle dependent color, and are used to protect security articles against counterfeiting and/or illegal reproduction by commonly available color scanning, printing and copying office equipment. The optically variable characteristic impart a different color impression at different viewing angles. By "different color impression", it is meant that the element exhibits a difference of at least one parameter of the CIELAB (1976) system, preferably exhibits a different "a*" value, a different "L*" value or a different "b*" value or exhibits two or three different values chosen among "a*", "b*" and "L*" values at different viewing angles. In contrast to optically variable features that exhibit different colors or color impressions upon variation of the viewing angle, color constant features consist of features that do not exhibit a color change or color impression change upon variation of the viewing angle. Typical examples of optically variable security features consist of optically variable patterns such as for example cholesteric liquid crystal polymer coating or may consist of printed pattern made of an optically variable ink, said optically variable ink comprising optically variable pigments such as for example thin film interference pigments, interference coated pigments, cholesteric liquid crystal pigments or mixtures thereof.

Thin-film interference pigments exhibiting optically variable characteristics are known to those skilled in the art and disclosed in U.S. Pat. Nos. 4,705,300; 4,705,356; 4,721,271; 5,084,351; 5,214,530; 5,281,480; 5,383,995; 5,569,535, 5,571,624 and in the documents related to these. Thin film Interference pigments comprising a Fabry-Perot reflector/dielectric/absorber multilayer structure and more preferably a Fabry-Perot absorber/dielectric/reflector/dielectric/absorber multilayer structure, wherein the absorber layers are partially transmitting and partially reflecting, the dielectric layers are transmitting and the reflective layer is reflecting the incoming light are particularly used in the field of security.

Interference coated pigments include without limitation structures consisting of a material selected from the group consisting of metallic cores such as titanium, silver, aluminum, copper, chromium, germanium, molybdenum or tantalum coated with one or more layers made of metal oxides as well as structures consisting of a core made of synthetic or natural micas, other layered silicates (e.g. talc, kaolin and sericite), glasses (e.g. borosilicates). silicium dioxides ($SiO_2$), aluminum oxides ($Al_2O_3$), titanium oxides ($TiO_2$), graphites and mixtures thereof coated with one or more layers made of metal oxides (e.g. titanium oxides, zirconium oxides, tin oxides, chromium oxides, nickel oxides and copper oxides), the structures described hereinabove have been described for example in Chem. Rev. 99 (1999). G. Pfaff and P. Reynders, pages 1963-1981 and WO 20081083894.

Liquid crystals in the cholesteric phase exhibit a molecular order in the form of a helical superstructure perpendicular to the longitudinal axes of its molecules. The helical superstructure is at the origin of a periodic refractive index modulation throughout the liquid crystal material, which in turn results in a selective transmission/reflection of determined wavelengths of light (interference filter effect). Cholesteric liquid crystal polymers can be obtained by subjecting one or more cross-linkable substances (nematic compounds) with a chiral phase to alignment and orientation. The pitch (i.e. the distance over which a full rotation of 360° of the helical arrangement is completed) can be tuned in particular by varying selectable factors including the temperature and solvents concentration, by changing the nature of the chiral component(s) and the ratio of nematic and chiral compounds. Crosslinking under the influence of UV radiation freezes the pitch in a predetermined state by fixing the desired helical form so that the color of the resulting cholesteric liquid crystal materials is no longer dependent on external factors such as temperature.

Cholesteric liquid crystal materials may then be shaped to cholesteric liquid crystal pigments by subsequently comminuting the polymer to the desired particle size. Examples of coatings, films and pigments made from cholesteric liquid crystal materials and their preparation are disclosed in U.S. Pat. Nos. 5,211,877; 5,362,315; 6,423,246; EP 1 213 338 A1; EP 1 046 692 A1 and EP 0 601 483 A1, the respective disclosures of which are incorporated herein by reference.

It should be noted that the optically variable characteristics of the optically variable security features described herein are not limited to the visible range of the electromagnetic spectrum. For example, the optically variable security features may exhibit, at least one viewing angle, a different position of the selective reflection band and/or a different CIE (1976) color index parameter in the visible, IR (infrared) or UV (ultraviolet) ranges and/or color-shifting properties from the visible range to the IR range, or from the UV range to the visible range, or from the UV range to the IR range.

Machine authentication of an optically variable security feature may be performed by illuminating said optically variable security feature so as to form a first light reflected and/or refracted by the security feature at a first view angle and a second light reflected and/or refracted by the security feature at a second view angle, the first and second lights having different spectral compositions as a result of the optically variable security feature, capturing the first light and the second reflected and/or refracted light and comparing the two reflected and/or refracted lights/colors perceived with two reference colors. Examples of such detectors can be found in WO 2004/097716 A1, WO 20121001077 A1 and WO 2013/045082 A1.

Generally, the security feature detector of at least some embodiments of the present invention may be implemented in line with or similar to the following descriptions. Firstly, WO 2004/097716 A1 discloses a suitable security feature detector to detect a physical property of an optically variable security feature. WO 2004/097716 A1 discloses a device comprising at least two light sources having different spectral characteristics for providing sequential illumination to the optically variable security feature; at least two photodetectors with optional collection optics for collecting light reflected by said security feature at least at two predefined and different observation angles and delivering an electric signal corresponding to the collected light intensity; analog-to-digital converting, processing, controlling and memory means, for controlling the light sources, digitizing and storing reflected intensity values, for comparing said intensity values with previously stored corresponding reference values, and for deriving an authenticity indicator from the comparison result, all according to a predefined algorithm and using a pre-established decision criterion; characterized in that the device comprises a wide-angle illumination optics for guiding the light of said light sources to said security feature.

WO 2012/001077 A1 discloses a suitable security feature detector to detect a physical property of an optically variable security feature. WO 2012/001077 A1 discloses a device including a) a light source configured to illuminate the optically variable security feature so as to form a first light reflected by the security feature at a first view angle and a second light reflected by the security feature at a second view angle, the first and second lights having different spectral compositions as a result of the optically variable marking; b) a prism that refracts said second reflected light so as to redirect said second reflected light; c) an optical sensor that captures the first light and the second refracted light simultaneously; and d) a processing unit that determines optical properties of said optical variable security feature based on said captured first light and the second refracted light. WO 2013/045082 A1 discloses a suitable security feature detector to detect a physical property of an optically variable security feature, said device comprising a plate of light-refractive material, said plate having two surfaces and an array of light-refracting protrusions or recesses on at least one of said surfaces, and being disposed in said device such as to provide, aside each other, a direct view and a view through said plate onto at least parts of said optically variable security feature, said view through said plate being an angularly deflected view, resulting from light refraction at said protrusions or recesses.

Security features based on emission characteristics are known In the art as luminescent materials. Luminescent materials are widely used as marking materials in security applications. Luminescent materials may be inorganic (inorganic host crystals or glasses doped with luminescent ions), organic or organometallic (complexes of luminescent ion(s) with organic ligand(s)) substances. Luminescent materials can absorb certain types of energy in the electromagnetic spectrum, i.e. UV, VIS, and IR range, acting upon them and subsequently emit at least partially this absorbed energy as electromagnetic radiation. Luminescent materials are detected by exposing with a certain wavelength of light and analyzing the emitted light. Down-converting luminescent materials absorb electromagnetic radiation at a higher frequency (shorter wavelength) and at least partially re-emit it at a lower frequency (longer wavelength). Up-converting luminescent materials absorb electromagnetic radiation at a lower frequency and at least partially re-emit part of it at a higher frequency. Light emission of luminescent materials arises from excited states in atoms or molecules. Luminescent materials may be divided in: (i) phosphorescent materials wherein a time delayed radiation emission is observable after the excitation radiation is removed (typically, with a decay lifetime from above about 1 µs to about 100 s), and (ii) fluorescent materials wherein a prompt radiation emission upon excitation Is observable (typically, with a decay lifetime below 1 µs). Both fluorescent and phosphorescent compounds are suitable for the realization of machine readable security feature. In the case of phosphorescent compounds, measurement of decay characteristics may also be carried out and used as a machine readable feature.

Security feature detectors to detect a physical property of a luminescent security feature may comprise a light source to illuminate the luminescent security feature with excitation light and a light sensor (also referred in the art as photodetector) for measuring the luminescence intensity versus the background radiation intensity. A phase detector may be used for the suppression of background signals. Depending on the part of the spectrum used for the detection of the luminescent material, the light source may be an incandescent lamp, typically for wavelengths between about 400 nm to about 2500 nm used with mechanical or opto-electronic devices for delivering pulsed light, or a flash lamp (e.g. a Xenon high-pressure flash lamp), or a laser or Light-Emitting-Diode (LED) emitting in the UV, visible or IR region, typically for wavelengths from about 250 nm to about 1000 nm. The light source may be powered by a drive current (for a LED, for example) or by a drive voltage (for a discharge lamp, for example). The light sensors or photodetectors may be photodiodes (single or arrays), phototransistor or photoresistance circuits, linear CMOS or CCD sensors, for example.

Security features comprising infrared (IR) absorbing materials are widely known and used in security applications. They are based on the absorption of electromagnetic radiation due to electronic transitions in a spectral range between about 700 nm and about 2500 nm, as defined here above. In the domain of machine authentication of security documents, a range of 700 nm to 1500 nm is preferred, and a range of 800 nm to 1000 nm is particularly preferred. For example, IR absorbing features have been implemented in banknotes for use by automatic currency processing equipment, in banking and vending applications (automatic teller machines, automatic vending machines, etc.), in order to recognize a determined currency bill and to verify its authenticity, in particular to discriminate it from replicas made by color copiers. IR absorbing materials include inorganic materials, glasses comprising substantial amounts of IR-absorbing atoms or ions or entities which display IR-absorption as a cooperative effect. IR absorbing organic compounds and IR absorbing organometallic compounds (complexes of cation(s) with organic ligand(s), wherein either the separate cation and/or the separate ligand, or both in conjunction, have IR-absorbing properties). Typical examples of IR absorbing compounds include among others carbon black, quinone-diimmonium or aminium salts, polymethines (e.g. cyanines, squaraines, croconaines), phthalocyanlne or naphthalocyanine type (IR-absorbing pi-system), dithiolenes, quaterrylene diimides, metal (such as for example transition metal or lanthanide) salts (such as for example fluorides, chlorides, bromides, iodides, nitrates, nitrites, sulfites, sulfates, phosphates, carbonates, borates, benzoates, acetates, chromates, hexaborides, molybdates, manganates, ferrates, organosulfates, organosulfonates, organophosphonates, organophosphates and phosphonotungstanates), metal oxides (such as for example indium tin oxide, antimony tin oxide in nano-particulate form, doped tin(IV) oxide, cooperative property of the $SnO_4$ crystal), metal nitrides. IR absorbing compounds comprising a transition element compound and whose infrared absorption is a consequence of electronic transitions within the d-shell of transition element atoms or ions such as those described in WO 2007/060133 A2 may also be used for the present invention.

Machine authentication of security features comprising one or more IR absorbing compounds may be performed by using an IR authenticating device comprising one or more IR sources, one or more IR detectors, an analog-to-digital converter and a processor. The security feature comprising the one or more IR absorbing compounds is illuminated by the one or more IR sources, simultaneously or subsequently, the one or more IR detectors detect a signal corresponding to the intensity of light reflected by said security feature, the analog-to-digital converter converts said signal into a digital information that is compared by the processor to a reference stored in a database. The IR authenticating device then outputs a positive signal (meaning that the security feature is genuine) or a negative signal (meaning that the security feature is fake). Optionally, the IR authenticating device may comprise one or more light diffusing elements (like a condenser), one or more lens assemblies (like focusing or collimating lenses), one or more reflecting elements (like mirrors, especially semi-transparent mirrors), one or more light dispersing or diffracting elements (like a prism, a hologram or a grating) and one or more optical filters. In an arrangement, the IR light source illuminates the security feature comprising the one or more IR absorbing compounds at a given angle through a diffuser or a condenser, and the IR detector receives the reflected light through a collimating lens assembly at the same angle. The optional prism, hologram or grating may be placed either between the IR source and the security feature to illuminate said security feature with monochromatic radiation, or between said security feature and said detector to provide said detector with monochromatic reflected light.

In another arrangement (described in WO 00/070536 A1), the IR light is emitted through a focusing lens assembly and deflected to the security feature by a semi-transparent mirror, the illumination direction being substantially perpendicular to said security feature. The light that is reflected away from the security device is collimated, in a direction that is also substantially perpendicular to said security feature, by a second lens assembly and directed towards a prism or a hologram to generate a spectrum. Finally, the generated spectrum is focused with a third lens assembly towards a detector assembly comprising a plurality of IR detectors, each sensitive to a different and limited range of the IR region of the electromagnetic spectrum.

Depending on the region of the electromagnetic spectrum that is used, the IR source may comprise one or more IR LED's (in particular GaAs and AlGaAs), one or more semiconductor laser diodes (in particular InGaAsP), one or more incandescent (like tungsten) lamps, one or more halogen lamps, one or more thermal emitters (nichrome), one or more xenon lamps or a combination thereof. For the machine authentication of a security feature comprising one or more IR absorbing compounds, the preferred IR sources are GaAs and AlGaAs LED's, as well as InGaAsP laser diodes. The IR detector is selected from the group consisting of photomultipliers, thermal detectors and quantum detectors. For the machine authentication of IR absorbing compounds, quantum detectors are preferred. This category includes photovoltaic detectors like Ge (800 to 1800 nm) or InGaAs (700 to 1700 nm), photoconductive detectors like PbS (1000 to 3600 nm) or PbSe (1500 to 5800 nm) and CCO or CMOS sensors (400 to 1000 nm). Particularly preferred are Ge or InGaAs detectors that are sensitive to a narrow band of IR light (i.e. "wavelength selective" detectors) that can be disposed as an array, thus yielding a spectrum of the intensity of the reflected light as a function of the wavelength. The advantage of CCO and CMOS sensors is that they can be provided as linear sensors or as two-dimensional sensors, said two-dimensional sensors being able to provide an image of the security feature comprising the one or more IR absorbing compounds. In any case, the response provided by the detector, being either the intensity of the reflected light at one or more wavelengths upon a single point illumination or a whole image of said security feature, is compared with a reference to output a positive or negative signal.

The security feature comprising the one or more IR absorbing compounds may consist of a pattern, an image, a logo, a text, a number, or a code (like a bar code or a QRcode). The security feature may be made of a coating composition comprising the one or more IR absorbing compounds, or may be made of a first part that comprises the one or more IR absorbing compounds and a second part that comprises one or more compounds absorbing in another region of the electromagnetic spectrum (e.g. UV or visible). When said second part comprises compounds absorbing in the visible region of the electromagnetic spectrum, the security feature may be conceived in such a way that the first and second part build an image, both parts being made of coating compositions that are color matched in the visible spectrum. Thus, both parts are essentially indistinguishable to the human eye. Said first and second parts may be adjacent to each other, overlapping each other or spaced apart, for example. In such a case, the authenticating device may comprise one or more sources emitting in the visible part of the spectrum (for example red and/or green LED's) and one or more sources emitting in the IR part of the spectrum (for example one or more GsAs LED's with selective wavelengths), the detector being a CMOS or a CCO sensor. Optionally, the authenticating device may be completed by UV sources (like UV LED's), like in US 2005/0139681. Said security feature is then sequentially illuminated by the one or more visible sources, by the one or more IR sources and by the one or more optional UV sources, and the CMOS or CCO sensor takes a picture of the security feature under each illumination. This provides a set of images than can be used separately or combined in any way, the separate pictures or the combination pictures being then compared to reference images stored in a database.

It is possible to achieve in this way a particularly high quality of the output positive or negative signal. This is for example described in WO 01/024106 A1, wherein three different light sources (UV, VIS, IR) are used to illuminate, in a sequential way, a two-dimensional barcode printed with three different coating compositions, each comprising compounds absorbing in each of the three regions. The image of the two-dimensional barcode corresponding to each of the three regions is sequentially taken by a sensor (like a CCO or a CMOS sensor), and these images are then combined to generate a multi-dimensional barcode comprising the information relative to each of the three regions. Alternatively, a customized sensor may be designed with filters, at the pixel level, sensitive to each of the three regions, so that the two-dimensional barcode may be illuminated substantially simultaneously with the three different light sources and the multi-dimensional barcode may be generated in one illumination.

Examples of security features based on light polarization characteristics include cholesteric liquid crystal materials. As mentioned hereinabove, liquid crystals in the cholesteric phase exhibit a molecular order in the form of a helical superstructure perpendicular to the longitudinal axes of its molecules. The particular situation of the helical molecular arrangement leads to cholesteric liquid crystal materials exhibiting the property of dispersing unpolarized incident light into components with different polarization, i.e. the reflected light to be left-hand or right-hand circularly polarized depending on the sense of rotation of the helices. Since the human eye is unable to detect the polarization state of the light it is receiving, such as the circular polarization effect of cholesteric liquid crystal materials, the difference in handedness can be detected by machine testing by measuring the polarization of the light reflected from the cholesteric liquid crystal material.

Security feature detectors to detect handiness of a cholesteric liquid crystal material based security feature may comprise one or more lighting sources and one or more receivers comprising one or more polarization-selective elements. The one or more light sources may be chosen from ambient light, incandescent light, laser diodes, light emitting diodes, and all type of light sources having color filters. The one or more polarization-selective elements may be passive means such as for example polarization filters, i.e. left-handed or right-handed circular polarizing filters, or a juxtaposition of both. This allows determining the rotation sense of the helical pitch of the cholesteric liquid crystal material by determining the polarization state of the light reflected by said material. Alternatively, authentication of a cholesteric liquid crystal material based security feature may be performed with the use of circular polarized light from at least one polarized light source.

Alternatively, authentication of a cholesteric liquid crystal material based security feature may be performed with the use of an electro-optical authentication device, said device either comprising at least one photocell in combination with a circular polarization filter and/or with a circular polarized light source or comprising an electro-optic camera, such as a linear CCO sensor array, a 2-dimensional CCO image sensor array, a linear CMOS image sensor array, or a 2-dimensional CMOS image sensor array, in combination with a circular polarization filter and/or with a circular polarized light source. Optionally, the circular polarization filter or the circular polarized light source described hereinabove can be combined with color filters, to select a particular spectral domain and to enhance the contrast ratio of the light reflected from the liquid crystal material to the light reflected from the background. Examples of such detectors can be found in U.S. Pat. No. 6,570,648 and WO 2009/121605 A1.

According to further embodiments, the physical property of the security feature described herein consists of a combination of different optical properties such as for example optically variable properties and emission properties as well as optically variable properties and light polarization properties. Typical examples of security features based on optically variable properties and light polarization properties consist of cholesteric liquid crystal materials based security features described here above.

According to further embodiments, the physical property of the security feature described herein consists of magnetic properties. Magnetic materials are widely used as marking materials in security applications to confer to the security article an additional, covert, security element which can be easily sensed by electronic means. Magnetic compounds exhibit particular and detectable magnetic properties of the ferromagnetic or ferrimagnetic type and include permanent magnetic compounds (hard-magnetic compounds with coercivity $H_c>1000$ A/m) and magnetizable compounds (soft-magnetic compounds with coercivity $H_c \leq 1000$ A/m according to IEC60404-1 (2000)). Typical examples of magnetic compounds include iron, nickel, cobalt, manganese and their magnetic alloys, carbonyl iron, chromium dioxide $CrO_2$, magnetic iron oxides (e.g. $Fe_2O_3$; $Fe_3O_4$), magnetic ferrites, $M(II)Fe(III)_2O_4$ and hexaferrites $M(II)Fe(III)_{12}O_{19}$, the magnetic garnets $M(III)_3Fe(III)_5O_{12}$ (such as Yttrium iron garnet $Y_3Fe_5O_{12}$) and their magnetic isostructural substitution products and particles with permanent magnetization (e.g. $CoFe_2O_4$). Magnetic materials are notably characterized by the dependence of their magnetic flux density B as a function of the applied external magnetic field H. At low magnetic field H, the magnetic flux density B is roughly proportional to H, i.e. $B=\mu H$ ($\mu$ being the relative magnetic permeability). A non-linear behavior of the magnetization function B (H) is generally observed at high magnetic fields H, where p eventually becomes equal to one, i.e. upon magnetization saturation. For many magnetic materials, on decreasing the strength of the magnetic field H from the saturation value to zero, B remains at some fixed value Br, called magnetic remanence. To bring B back to zero again, a negative magnetic field $H_c$, called magnetic coercivity, must be applied to the material. This behavior is called magnetic hysteresis, and the B (H) curve. or magnetization characteristics of such a material is called the magnetic hysteresis curve.

Authentication of security features comprising one or more magnetic materials may be performed by using a magnetic detection device (magnetic detector) comprising one or more magnetic sensors, one or more analog-to-digital converters and a processor. Optionally, the magnetic detection device may comprise one or more magnetization units under the form of permanent magnets and/or electromagnets, and one or more amplifiers. The one or more magnetic sensors and the optional one or more magnetization units can be moveably mounted on one or more linear guidelines or on one or more cylinders and provided with one or more electric stepping motors (linear or circular). Alternatively, said one or more magnetic sensors and said one or more optional magnetization units can be provided as multiple groups or arrays, each group or array possessing its own linear guideline or cylinder and its own stepping motor (linear or circular) and being able to move independently. The security article carrying the security feature comprising one or more magnetic materials can then be conveyed to the magnetic detection unit through a document-guiding unit. The one or more magnetic sensors and the one or more optional magnetization comprised in said magnetic detection unit move back and forth, when they are mounted on one or more linear guidelines, or circularly, when they are mounted on one or more cylinders, together or as independent groups or arrays, in a selected sequence and at a required speed to detect the information contained within said security feature as a variation of voltage, of resistance or of current, depending on the type of the magnetic sensors being used. The detected information is then sent, after optional amplifying and digital converting, to the processor wherein it is compared with references or threshold values contained in a database. A positive or negative signal is then output.

When the security feature comprises one or more high-coercivity materials (which possess a remanent magnetization), the one or more magnetic sensors measure the intensity of said remanent magnetization. When the security feature comprises one or more low-coercivity materials (which do not have a measurable remanent magnetization and need to be magnetized with an external magnetic field H), the one or more magnetic sensors may measure the variation of the magnetic field H due to the magnetic permeability of the one or more low-coercivity materials. The external magnetic field can be provided by one or more permanent magnets, and/or one or more electromagnets. Advantageously, the one or more permanent magnets and/or the one or more electromagnets are included within the one or more magnetic sensors.

In general, a magnetic sensor is a sensor which serves to detect a magnetic field. Depending on the magnetic material and on specific embodiments of the magnetic detection device, different types of magnetic sensors may be used. Known are for example inductive sensors (comprising coils), fluxgate sensors (comprising a thin ferromagnetic core on which two coils, one for excitation and one for detection, are wound), magnetoresistive sensors, which experience a resistance increase dependent on the applied magnetic field, Hall-effect sensors, in which a voltage dependent on the applied magnetic field is generated, and magneto-optical sensors. Magnetoresistive sensors suitable for the machine detection of magnetic compounds include classical magnetoresistive sensors, anisotropic magnetoresistance sensors (AMR), and giant magnetoresistance sensors (GMR). Usually, the signal generated by passing the security feature comprising the one or more magnetic materials by the one or more magnetic sensors and the one or more optional magnetization units is weak; hence an amplification circuit is needed. Advantageously, and with the aim of limiting the noise induced by the amplification circuit and the associated decrease of the signal-to-noise ratio, each one of the one or more magnetic sensors possesses its own amplification circuit, or, when the one or more magnetic sensors are provided as a group or array, the amplification circuit is coupled with said group or array.

The one or more magnetic materials may be integrated in a coating composition to be printed or coated directly onto the security article, or by printing or coating a thread, a stripe or a foil to be applied to or integrated into the security article. The coating composition may be applied either continuously, building easy to detect plain area, or only in certain areas, for example under the form of a code, an image, a logo, a text or a pattern. When the coating composition is printed as a text, the text may be read using a specific type of magnetic sensors, called magnetic ink character recognition (MICR) sensors, as mentioned in US 2009/152 356 A1.

Additionally to the one or more magnetic materials, said coating composition may comprise colorants or pigments absorbing in the UV, the visible or the IR region of the electromagnetic spectrum. The whole security feature may be made of a coating composition comprising one or more magnetic materials, or of a first part that comprises said one or more magnetic materials, and of a second part that does not contain a magnetic material. The security feature may be conceived in such a way that said first and second parts build an image, both parts being made of coating compositions that are color matched in the visible region of the electromagnetic spectrum. Thus, both parts can be essentially indistinguishable to the human eye, the first part comprising one or more magnetic materials being only detectable using a magnetic detection device as described here above. Said first and second parts may be adjacent to each other, overlapping each other or spaced apart.

Advantageously, the security feature comprising one or more magnetic materials may be made of a plurality of magnetic regions with different magnetic properties, adjacent to each other, overlapping each other or having gaps between them. For example, US 2013/082105 A1 discloses a method of checking value documents having a security element with a plurality of magnetic areas, which include at least one high-coercivity magnetic region having a high-coercivity magnetic material, one low-coercivity magnetic region having a low-coercivity magnetic material, and optionally a combined magnetic region, which contains both the high-coercivity magnetic material and the low-coercivity magnetic material. All three regions can be reliably distinguished on the basis of their specific magnetic response.

According to further embodiments, the physical property of the security feature described herein consists of a combination of optical properties, in particular optically variable properties and magnetic properties. Typical examples of security features based on optically variable magnetic properties include without limitation magnetic thin film interference materials, magnetic coated pigments and magnetic cholesteric liquid crystal materials. Magnetic thin film interference materials, in particular magnetic thin film interference pigment particles, are known to those skilled in the art and are disclosed e.g. in U.S. Pat. No. 4,838,648; WO 2002/073250 A2; EP 0 686 675 81; WO 2003/000801 A2; U.S. Pat. No. 6,838,166; WO 2007/131833 A1; EP 2 402 401 A1 and in the documents cited therein. Typical examples of magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure. Five-layer Fabry-Perot multilayer structures consist of absorber/dielectric/reflector/dielectric!absorber multilayer structures wherein the reflector and/or the absorber is also a magnetic layer. Six-layer Fabry-Perot multilayer structures consist of absorber/dielectric/reflector/magnetic/dielectric/absorber multilayer structures. Seven-layer Fabry Perot multilayer structures consist of absorber/dielectric/reflector/magnetic/reflector/dielectric/absorber multilayer structures.

Magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1; U.S. Pat. Nos. 6,582,781; and 6,531,221. WO 2006/063926 A1 discloses monolayers and pigment particles obtained therefrom with high brilliance and color-shifting properties with additional particular properties, such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigment particles which comprise the sequence A1/B/A2, wherein A1 and A2 may be identical or different and each comprises at least one cholesteric layer, and B is an interlayer absorbing all or some of the light transmitted by the layers A1 and A2 and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

According to further embodiments the physical property of the security feature described herein consists of conductivity properties. A security feature comprising one or more conductive materials may be detected by simple detection devices, like electrode circuits that are contacted with said security feature. Advantageously, said detection devices comprise contactless electronic means, such as inductive or capacitive sensors. Capacitive sensors use an electric field oscillating at a high frequency (typically 500 kHz to 1 MHz). Bringing the capacitive sensor towards the security feature comprising the one or more conductive materials changes the capacitance of the sensor, which in turn generates a current flow in the sensor. The sensor electronics produces a calibrated voltage which is proportional to the magnitude of the current flow, thus indicating the presence or the absence of the security feature comprising one or more conductive materials. Inductive sensors use an oscillating magnetic field generated by passing AC current through one or more coils. When said oscillating magnetic field interacts with the security feature comprising one or more conductive materials, an eddy current (also called induced current) is produced, which generates an oscillating magnetic field that opposes the oscillating field of the inductive sensor. This is turn yields a current flow in the inductive sensor, said current flow being transformed into a calibrated voltage by the sensor electronics, as previously described for the capacitive sensor. In the field of security, capacitive sensors are usually preferred because there are able to detect small conductive elements without interacting with the environment (substrate or surrounding hardware). For example, U.S. Pat. No. 5,650,729 describes a conductive strip detector comprising a capacitor defined by an elongate, electrically conductive element and a laterally spaced, electrically conductive member. Monitoring circuitry monitors changes in the capacitance of the capacitor when an electrically conductive strip substantially parallel to the element is passed by the capacitor and indicates when a change in capacitance is due to the presence of an electrically conductive strip.

The security feature may comprise, additionally to the one or more conductive materials, one or more materials that react to induced electric current and/or induced voltage, like an electroluminescent material or an electrochromic material. In this case, the one or more conductive materials of the security feature are detected indirectly, using the light emitted by the luminescent material or the change of color of the electrochromic material.

The conductive materials may be a metal like aluminum, copper, nickel, iron, lead, zinc and tin, and alloys thereof, coated on a polymeric substrate like PET, PVC or BOPP (biaxially oriented polypropylene) under the form of a thread (metallized or partially demetalized), a stripe, a foil or a decal, applied to or embedded into the substrate of the security article. In the simplest form, metallic wires may be processed directly within the substrate (plastic like BOPP, wood pulp or cotton pulp). The one or more conductive materials may also be embedded in a polymeric matrix, as described in US 2014/291495. Said matrix comprises one or more non-conducting, transparent or non-transparent thermoplastic polymers such as PC (polycarbonate, especially bisphenol A polycarbonate), PET (polyethylene terephthalate), PMMA (polymethyl methacrylate), TPU (thermoplastic polyurethane elastomers), PE (polyethylene), PP (polypropylene), PI (polyimide), PVC (polyvinyl chloride), polystyrene, polyacrylates and methacrylates, vinyl esters, ABS and copolymers and/or blends thereof.

The one or more conductive materials embedded in said polymeric matrix are for example metallic nanoparticles, especially silver nanoparticles, pigments surface treated with one or more conductive layers (described for example in U.S. Pat. No. 7,416,688), pigments comprising a conductive core (described for example in EP 2 220171 B1), conductive mixed oxides like ZnO (zinc oxide), ITO (indium tin oxide) or ATO (antimony tin oxide), and carbon derivatives, like fullerenes, graphenes and carbon nanotubes (especially so-called MWNT, standing for multiwalled nanotubes, that are easier to produce and exhibit a higher conductivity than SWNT, single-walled nanotubes). Advantageously, pigments surface treated with one or more conductive layer are based on inexpensive core materials like titanium oxide, synthetic or natural micas, other phyllosilicates, glasses, silicon dioxides or aluminum oxides that are enwrapped by the conductive layer. Preferred are pigments surface treated with a conductive layer that exhibit a high aspect ratio, also called leafing pigments that orient themselves along the direction of coating or printing, thus improving the conductivity of the security feature. Alternatively, highly conjugated polymers may be used as the one or more conductive materials. They can provide the advantages that no polymer matrix is needed, and that they are able to build transparent, flexible layers. Such highly conjugated polymers are for example described in WO 2013/135339 A2, WO 2013/120590 A1, WO 2013/159862 A1 and WO 20131159863 A1). Preferred highly conjugated polymers are polyaniline, polythiophene (and especially PEDOT/PSS, obtained by copolymerizing 3,4-ethylenedioxythiophene with styrene sulfonate), polyfluorene, polyphenylenevinylene and polypyrrole. Particularly preferred is PEDOT/PSS, which shows good conductivity (close to ITO, indium tin oxide), high transparency, and good flexibility and mechanical resistance. Advantageously, and for reasons previously explained, the security feature comprising the one or more conductive materials may contain one or more luminescent materials. The one or more luminescent materials are selected from the group consisting of luminescent molecules (that are homogeneously dissolved into the polymeric matrix), luminescent pigments (that are dispersed within said polymeric matrix), semi-conductor quantum dots (like CdSe, ZnS, ZnSe, CdZnSe, CdS, InAs, InP, CdSeS), luminescent polymers (extensively described in US 2014/291495) and pigments that are surface-treated with a luminescent layer. Alternatively and/or additionally, the security feature comprising the one or more conductive materials may contain one or more electrochromic materials. The one or more electrochromic materials may be selected from the group consisting of polymeric electrochromic materials, non-polymeric electrochromic materials and blends thereof. A comprehensive list of electrochromic materials may be found in U.S. Pat. No. 8,243,356, which is incorporated herein by reference.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

The invention claimed is:

1. A mobile, portable apparatus for authenticating, verification and certification of a security article, the apparatus comprising:
    (a) an enclosure securely housing components of the apparatus;
    (b) an authentication device operable to authenticate the security article;
    (c) a power source;
    (d) an imaging device set comprising at least two imaging devices for simultaneously imaging in opposing directions for facilitating monitoring and collection of a visual record of an interaction between an operator of the apparatus and a security article user;
    (e) a programmable and configurable control panel;
    (f) an information processing unit; and
    (g) a printing device for printing and/or making a special marking on the security article,
    wherein the imaging device set is coupled to the authentication device and is operable to capture images of the use of the authentication device and of the operator using the authentication device; and
    wherein the control panel is arranged as an interface command and control center connected to the information processing unit and the other components of the apparatus.

2. The apparatus according to claim 1, wherein the control panel comprises a processing circuit and a memory circuit.

3. The apparatus according to claim 1, wherein the information processing unit is a computing device.

4. The apparatus according to claim 1, wherein the enclosure is configurable into a closed and an opened configuration.

5. The apparatus according to claim 1, wherein the enclosure further comprises a handle, one or several wheels and/or a lock.

6. The apparatus according to claim 1 further comprising an imaging support member, wherein the imaging support member is positionable to permit the imaging device set to capture images of the operator of the apparatus and an individual located at another position.

7. The apparatus according to claim 1 further comprising a biometric device.

8. The apparatus according to claim 1 further comprising a communications module for communication with remote infrastructure.

9. The apparatus according to claim 1 further comprising a light source.

10. The apparatus according to claim 1, wherein the power source comprises one or more accumulators.

11. The apparatus according to claim 1, wherein the power source comprises solar panels.

12. The apparatus according to claim 1, further comprising a tamper sensor.

13. A method of operating a mobile, portable apparatus for authenticating, verification and certification of a security article, the apparatus comprising:
   (a) an enclosure securely housing components of the apparatus;
   (b) an authentication device operable to authenticate the security article;
   (c) a power source;
   (d) an imaging device set comprising at least two imaging devices for simultaneously imaging in opposing directions for facilitating monitoring and collection of a visual record of an interaction between an operator of the apparatus and a security article user;
   (e) a programmable and configurable control panel;
   (f) an information processing unit; and
   (g) a printing device for printing and/or making a special marking on the security article,
   wherein the imaging device set is coupled to the authentication device and is operable to capture images of the use of the authentication device and of the operator using the authentication device; and
   wherein the control panel is arranged as an interface command and control center connected to the information processing unit and the other components of the apparatus,
   the method comprising:
   (a) determining, in an opened configuration of an enclosure of the apparatus, whether an image of a registered operator of the apparatus captured by the imaging device set is verified and/or the registered operator is in proximity; and
   (b) permitting and/or maintaining access to an authentication device of the portable authentication apparatus if the image of the registered operator is verified and/or the registered operator is in proximity, and
       wherein instances of tampering are detected by a motion sensor and/or electrically powered wires.

14. The method according to claim 13, wherein verification of the proximity of the operator occurs by proximity sensor.

15. The method according to claim 13, wherein in case of detection of tampering, a control panel is deactivated.

16. The method according to claim 13 wherein upon detection of tampering, software, solutions, codes and/or stored data is transmitted and/or deleted and/or components of the device are inactivated.

17. The apparatus according to claim 6, wherein the imaging support member is positionable to permit the imaging device set to simultaneously capture images of the operator of the apparatus and the individual located at another position, wherein the position is substantially on the opposite side.

18. The apparatus according to claim 9, wherein the light source is a UV-light and/or visible light, external of the passport reader.

19. The apparatus according to claim 12, wherein the tamper sensor includes a motion sensor and/or electrically powered wires.

20. The method of claim 13, wherein in step (a), the step of determining is performed reiteratively.

* * * * *